(12) United States Patent
Osada et al.

(10) Patent No.: US 8,139,171 B2
(45) Date of Patent: Mar. 20, 2012

(54) AUDIO/DISPLAY DEVICE

(75) Inventors: Yasuo Osada, Saitama (JP); Yutaka Sato, Kanagawa (JP)

(73) Assignee: Sony Corporation, Tokyo (JP)

( * ) Notice: Subject to any disclaimer, the term of this patent is extended or adjusted under 35 U.S.C. 154(b) by 1138 days.

(21) Appl. No.: 11/916,754

(22) PCT Filed: Jun. 23, 2006

(86) PCT No.: PCT/JP2006/312657
§ 371 (c)(1),
(2), (4) Date: Dec. 6, 2007

(87) PCT Pub. No.: WO2006/137543
PCT Pub. Date: Dec. 28, 2006

(65) Prior Publication Data
US 2009/0225239 A1    Sep. 10, 2009

(30) Foreign Application Priority Data

| Jun. 24, 2005 | (JP) | 2005-185596 |
| Jun. 24, 2005 | (JP) | 2005-185597 |
| Jun. 24, 2005 | (JP) | 2005-185598 |
| Apr. 10, 2006 | (JP) | 2006-107954 |
| Apr. 18, 2006 | (JP) | 2006-115042 |
| Apr. 18, 2006 | (JP) | 2006-115043 |

(51) Int. Cl.
*H04N 5/64* (2006.01)
(52) U.S. Cl. ..................... 348/841; 348/842
(58) Field of Classification Search ............... 348/841, 348/842, 843
See application file for complete search history.

(56) References Cited

FOREIGN PATENT DOCUMENTS
JP     5-122788    5/1993
JP     10-243489   9/1998

*Primary Examiner* — Basil Katcheves
(74) *Attorney, Agent, or Firm* — Oblon, Spivak, McClelland, Maier & Neustadt, L.L.P.

(57) ABSTRACT

There is provided an audio/display apparatus including an audio unit (2) including speaker units (13L, 13R) that reproduce and output audio information, a display unit (3) including a display screen on which video information is displayed. It further includes a support frame (6) to support the display unit (3) fixedly, a carrier (7) which supports the audio unit (2) and is supported on the support frame (6) to be movable, and carrier moving mechanisms (34, 40) to move the carrier (7) in relation to the support frame (6). As the carrier (7) is moved by the carrier moving mechanisms (34, 40), the audio unit (2) is moved between a first position in which it will uncover the entire display screen of the display unit (3) and a second position in which it will overlap, and cover at least a part of, the display screen.

15 Claims, 30 Drawing Sheets

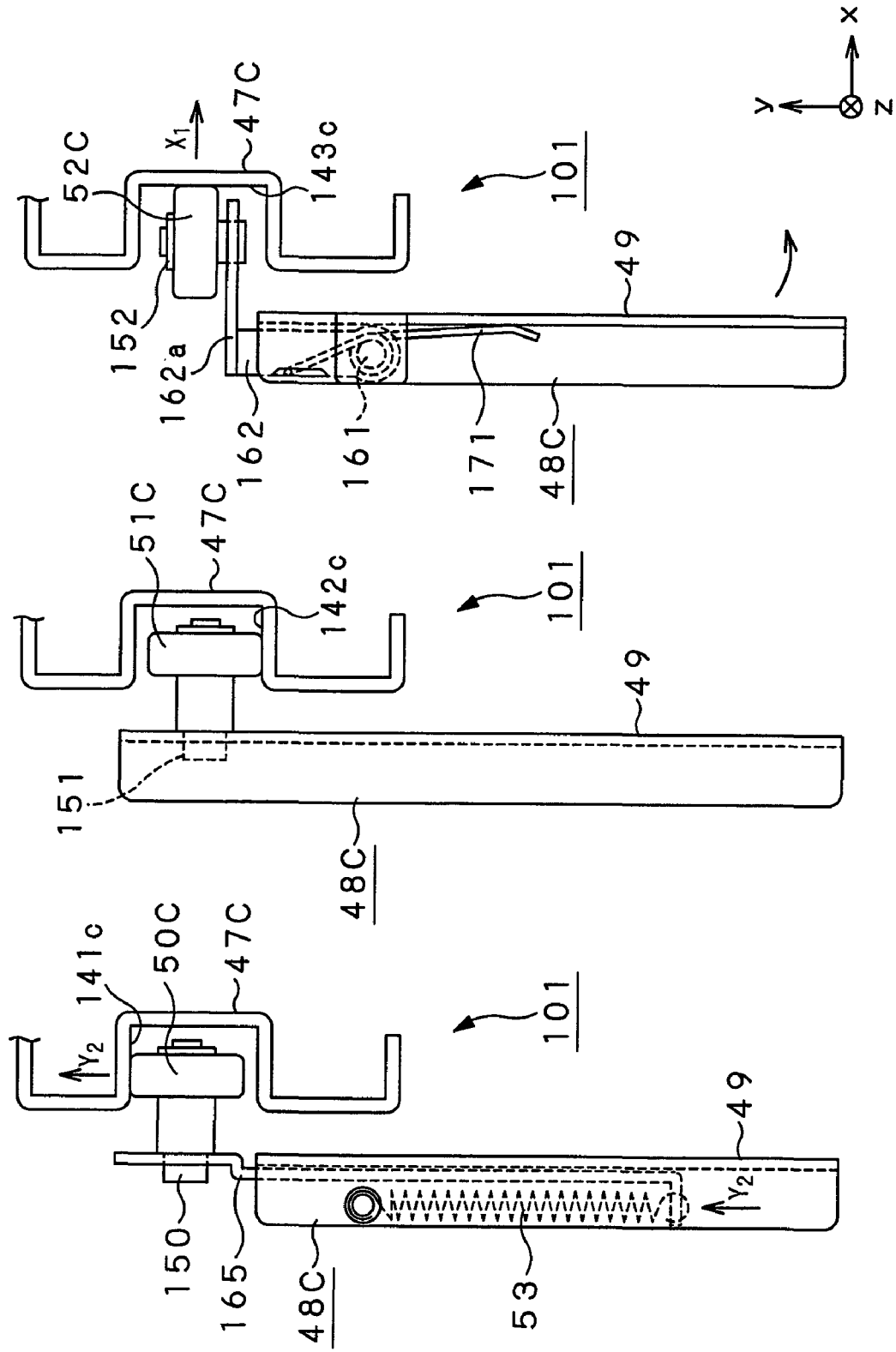

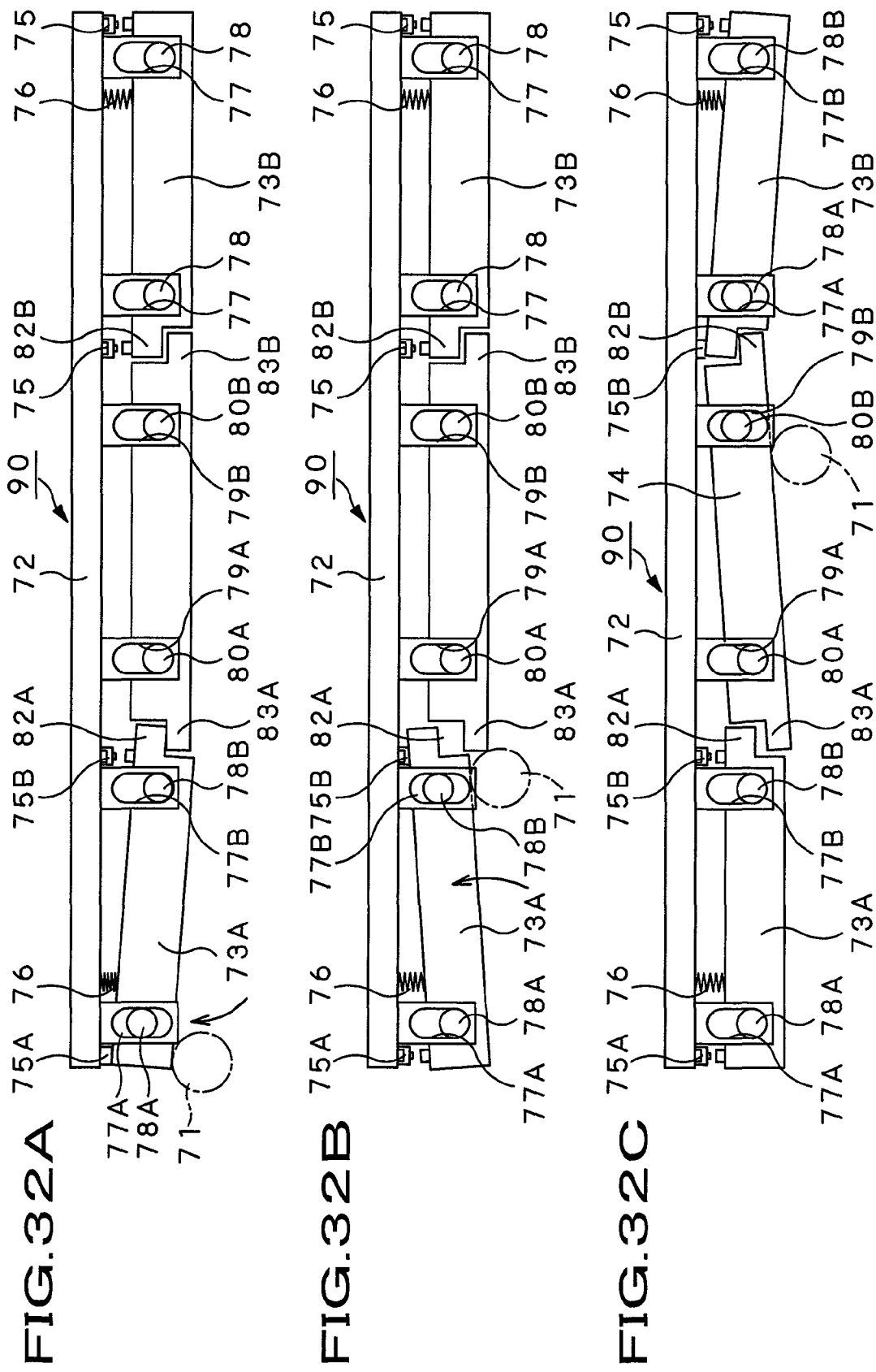

AUDIO/DISPLAY DEVICE

TECHNICAL FIELD

The present invention relates to an audio/display apparatus which is a combination of an audio unit including speaker units that reproduce and output audio information and a display unit including a display screen that displays a picture generated based on video information, and more particularly to an audio/display apparatus in which the audio unit is assembled the display unit to be movable in relation to the latter in such a manner that it will cover and uncover the display screen of the display unit.

This application claims the priorities of Japanese Patent Application JP 2005-185596 filed in the Japanese Patent Office on Jun. 24, 2005, Japanese Patent Application JP 2006-115042 filed in the Japanese Patent Office on Apr. 18, 2006 with a claim for priority based on JP2005-185596, Japanese Patent Application JP 2005-185597 filed in the Japanese Patent Office on Jun. 24, 2005, Japanese Patent Application JP 2006-115043 filed in the Japanese Patent Office on Apr. 18, 2006 with a claim for priority based on JP JP2005-185597, Japanese Patent Application JP 2005-185598 filed in the Japanese Patent Office on Jun. 24, 2005 and Japanese Patent Application JP 2006-107954 filed in the Japanese Patent Office on Apr. 10, 2006 with a claim for priority based on JP 2005-185598, the entire contents of which are incorporated herein by reference.

BACKGROUND ART

Hitherto, a display apparatus using a liquid crystal display or the like larger in size and smaller in thickness than the cathode-ray tube has been proposed as a display unit used in a television receiver and the like. Normally, a display unit of this type is installed in a best position for viewing and listening in a room in view of its features, and it is also acceptable as one of furnishings in the room. The display unit functions to receive and display video information sent by television broadcast and radio broadcast, and reproduce and display video information recorded in a variety of portable recording media such as a DVD (Digital Versatile Disc), CD (Compact Disc) or the like (will be referred simply as "recording medium" hereunder).

On the other hand, an audio unit to be used for combination with the above-mentioned display unit is one designed for reproduction of only audio information to provide a more realistic sound. Combination of an audio unit of this type with a large display unit of the above-mentioned type will permit to reproduce a more realistic sound synchronously with a picture being displayed on the display unit.

On this account, there has been proposed an audio/display apparatus which is a combination of an audio unit improved in performance of audio reproduction and a display unit and reproduces a picture with a realistic theater-in-the-home effect also at home. Namely, the combination of the audio and display units can realize a so-called home theater.

DISCLOSURE OF THE INVENTION

The display unit will be installed in a best position for viewing and listening in a room as mentioned above. However, in case the audio/display apparatus is in use for audio reproduction alone, the display screen of the display unit, displaying no picture thereon, will take the best position for viewing and listening in the room. Namely, the display screen will spoil the atmosphere in the room because it is just a dry and tasteless dark screen while it is displaying no picture. Especially, with the display unit becoming larger, this problem will be more serious.

Also, the user of an audio/display apparatus including an audio unit and display unit in combination can enjoy a television broadcast program, program sent via a communications network and information reproduced from a recording medium because a picture is displayed on the large display screen of the display unit and a realistic sound is outputted from the audio unit. Generally, in an audio/display apparatus of this type, the display screen is disposed at a height corresponding to the eye level of the user, while a speaker unit is disposed at either lateral side of the display screen to make stereo reproduction of audio information in an appropriate acoustic field.

In the above audio/display apparatus, in case only the audio function thereof is used only for audio reproduction, for example, the large, dry and tasteless screen located before the user's sight line will spoil the atmosphere of the acoustic space. Also, a larger display unit having a speaker unit disposed at either lateral side thereof will add to the size of the entire audio/display apparatus. Thus, in case the audio/display apparatus is to be designed smaller in total size, it is necessary to design the display screen of the display unit and the speaker units smaller. As the result, it will be difficult to implement any audio/display apparatus permitting to view a large picture while listening to realistic sound.

It is therefore desirable to overcome the above-mentioned drawbacks of the related art by providing novel audio/display apparatus that can provide a large display and high-power reproduced sound output, allowing the user to view a large picture and listen to realistic sound reproduced with a high performance. The apparatus contributes to creating atmosphere as one of room furnishings in a room even when it is installed in a most noticeable position in the room.

It is also desirable to provide an audio/display apparatus in which an audio unit is installed to a display unit to be movable in relation to the display unit so that when the display unit is not to be used, the audio unit can stably be moved to cover the display unit, without making the apparatus larger in size.

According to an embodiment of the present invention, there is provided an audio/display apparatus including an audio unit including speaker units that reproduce and output audio information, a display unit including a display screen on which video information is displayed, a support frame to support the display unit fixedly, a carrier which supports the audio unit and is supported on the support frame to be movable, and carrier moving mechanisms to move the carrier in relation to the support frame. As the carrier is moved by the carrier moving mechanisms, the audio unit is moved between a first position in which it will uncover the entire the display screen of the display unit and a second position in which the audio unit will overlap, and cover at least a part of, the display screen.

In the audio/display apparatus, the display unit displays any one of video information sent by a television broadcast, video information distributed via a communications network and video information reproduced by a recording-medium recorder/player, and the audio unit reproduces and outputs, by speaker units, any one of audio information sent by a television broadcast, radio broadcast or the like, audio information sent via a communications network and audio information reproduced by a recording-medium recorder/player.

The audio unit may include a recorder/player in which a recording medium is removably set to record and reproduce audio/video information sent by a television broadcast, radio broadcast or the like and audio/video information sent via a communications network.

Further, in the audio/display apparatus, the audio unit should desirably be adapted for movement to the first position in which it will uncover the entire display screen of the display unit when a video display mode in which a picture is to be displayed on the display screen of the display unit is selected.

Also, each of the carrier moving mechanisms for moving the carrier having the audio unit supported thereon includes a shaft-like feed screw supported on the carrier in parallel to the moving direction of the carrier, a driving member being in mesh with the feed screw and a drive motor that rotates the driving member. As the driving member is rotated by the drive motor, the feed screw is moved along with the carrier to move the audio unit between the first and second positions.

In an audio/display apparatus according to another embodiment of the present invention, a columnar support is provided at the base end of the support frame supporting the display unit, and the carrier moving mechanisms are installed on a carrier moving mechanism retainer located in an area where the audio unit supported movably in relation to the display unit is to be positioned and which is projected from the columnar support of the support frame. The carrier moving mechanisms are so installed on the carrier moving mechanism retainer that it will be accommodated in the audio unit when the carrier is moved in relation to the support frame down to the first position.

In an audio/display apparatus according to still another embodiment of the present invention, each of the carrier moving mechanisms includes a pair of shaft-like feed screws supported on the carrier in parallel to the moving direction of the carrier, a pair of driving members being in mesh with the respective feed screws and a drive motor to rotate the pair of driving members. As the pair of driving members is rotated by the drive motor, the feed screws in pair are moved along with the carrier to move the carrier between the first and second positions.

Each of the above audio/display apparatuses is acceptable as one of furnishings, which is normally installed in a most noticeable position in a room, and provides a large display and high power output of an acoustic signal. Also, since the display screen of the display unit, which is just a dry and tasteless dark screen when it is not displaying any picture, is covered with the audio unit, it will not spoil the atmosphere in the room.

Also, in each of the above audio/display apparatuses, the carrier supporting the audio unit is movable between the first position in which the audio unit will uncover the entire display screen of the display unit and second position in which it will overlap, and cover at least a part of, the display screen. Therefore, the feed screws should be axially long correspondingly to the display unit, which is a large one. However, since the feed screws are axially moved along with the carrier as the driving members are rotated by the drive motor, the carrier can be moved stably.

Further, in each of the above audio/display apparatuses, the carrier moving mechanisms are installed on the carrier moving mechanism retainer located in an area where the audio unit supported movably in relation to the display unit is to be positioned and which is projected from the columnar support of the support frame. The carrier moving mechanisms are so installed on the carrier moving mechanism retainer that it will be accommodated in the audio unit when the carrier is moved in relation to the support frame down to the first position.

The foregoing and other features, aspects and advantages of the present invention will be come apparent from the following detailed description of the present invention when taken in conjunction with the accompanying drawings.

BRIEF DESCRIPTION OF THE DRAWINGS

FIG. 18 illustrates a first guide roller mechanism, in which

FIG. 19 illustrates a second guide roller mechanism, in which

FIG. 20 illustrates a third guide roller mechanism, in which FIG. 20A is a side elevation of a first guide roller installed in place, FIG. 20B is a side elevation of a second guide roller installed in place and FIG. 20C is a side elevation of a third guide roller installed in place.

FIG. 21 illustrates a fourth guide roller mechanism, in which

FIG. 29 are fragmentary sectional views of the upper foreign matter detecting mechanism, in which

FIG. 32 explains the detection of a foreign matter by the lower foreign matter detecting mechanism, in which FIG. 32A explains the detection of a foreign matter at the lateral end of the detecting mechanism, FIG. 32B explains the detection of a foreign matter at an inner portion of the detecting mechanism and FIG. 32C explains the detection of a foreign matter at the central portion of the detecting mechanism.

BEST MODE FOR CARRYING OUT THE INVENTION

The present invention will be described in detail below concerning an audio/display apparatus each as embodiments thereof with reference to the accompanying drawings.

Figure 1:
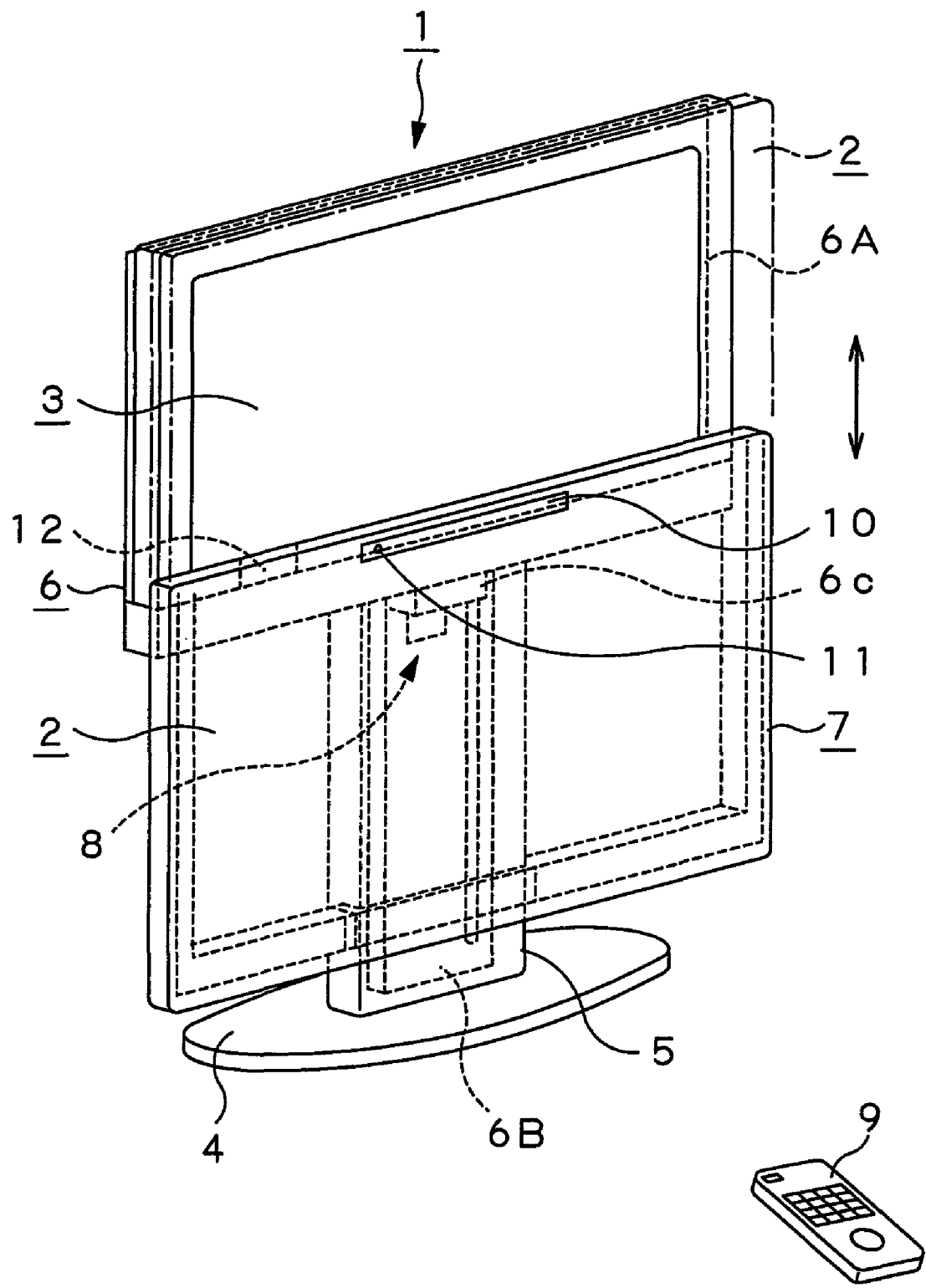
FIG. 1 is a perspective view of the audio/display apparatus according to an embodiment of the present invention, showing the audio unit moved down to a first position where it will uncover a liquid crystal display.
Figure 2:
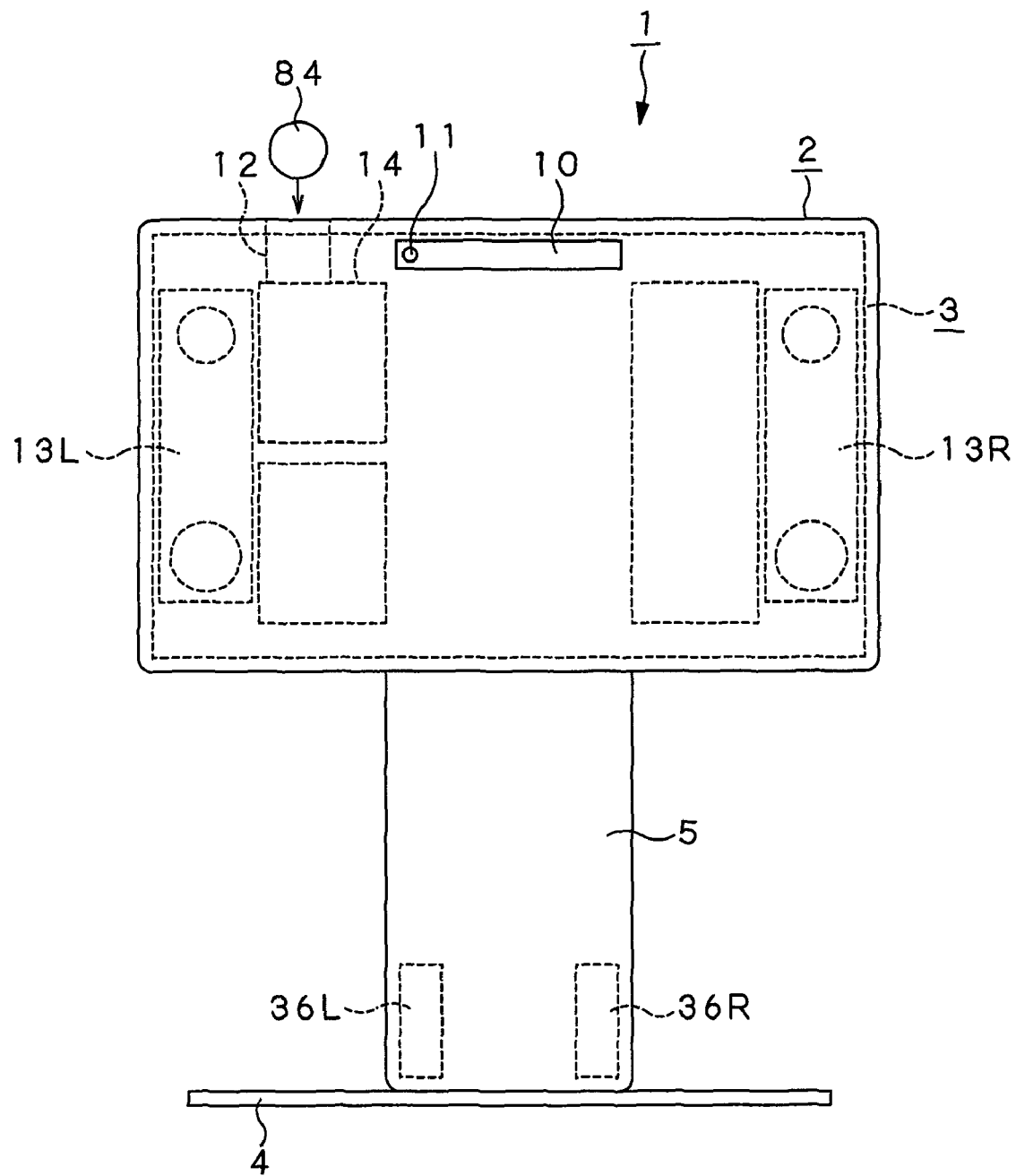
FIG. 2 is a front view of the audio/display apparatus, showing the audio unit moved up to a second position where it covers the liquid crystal display.

The audio/display apparatus, generally indicated with a reference numeral 1, is one of the embodiments of the present invention. It is designed as a stationary type for installation in a living room or the like. As shown in FIGS. 1 and 2, it includes an audio unit 2 and a display unit 3, constructed independently of each other. It also includes a base 4 having a stand 5 erected thereon. The stand 5 supports a support frame. The support frame 6 includes a frame-shaped body 6A on which the display unit 3 is installed, and a columnar support 6B. The columnar support 6B supports the frame-shaped body 6A and is erected on the base 4.

It should be noted that the columnar support 6B of the support frame 6 is disposed inside the stand 5.

Since the display unit 3 is supported on the frame-shaped body 6A supported on the columnar support 6B of which the height is fixed, it is supported at a fixed height from a floor surface on which the base 4 is placed.

A carrier 7 is supported on the support frame 6 to be movable vertically. The audio unit 2 is installed on the carrier 7. The carrier 7 is vertically moved in relation to the support frame 6 by an up/down drive mechanism 8 disposed in a drive mechanism retainer 6C provided on the columnar support 6B. It should be noted that the drive mechanism retainer 6C is formed for the columnar support 6B to swell at the front side thereof and has built therein a drive mechanism 85 of the up/down drive mechanism 8.

The audio unit 2 and display unit 3, constructed independently of each other, are installed to the support frame 6 and carrier 7, respectively, independently of each other. Therefore, the audio unit 2 and display unit 3 included in the audio/display apparatus 1 can be assembled in different assembling lines, respectively. The assembling lines can be arranged most suitably for the audio and display units 2 and 3, respectively. That is, the assembling lines can be streamlined for an improved reliability of finished products as well as for reduction of the manufacturing costs.

Also, when either the audio unit 2 or the display unit 3 has to be inspected or repaired, only the unit in question can be removed from the carrier 7 or support frame 6, which leads to streamlining of the maintenance and inspection procedure.

It should also be noted that the audio unit 2 and display unit 3 assembled together to form the audio/display apparatus 1 are electrically connected to each other via an interconnecting cable and the like.

Figure 5:
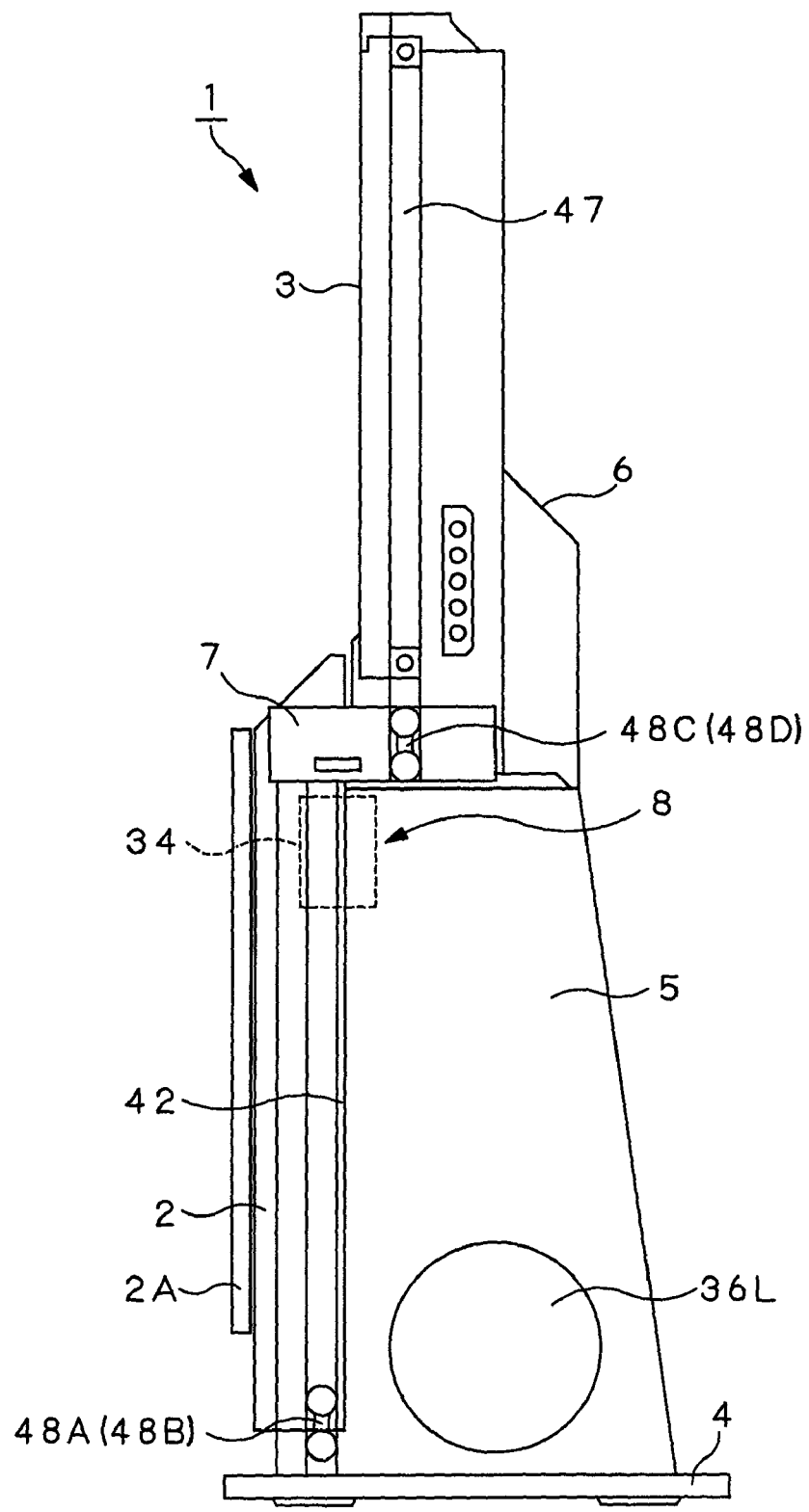
FIG. 5 is a side elevation of the audio/display apparatus, showing the audio unit having been moved down to the first position.

As shown in FIGS. 1 and 5, when the audio unit 2 supported to be movable up or down in relation to the display unit 3 is moved down in relation to the display unit 3 to a first position, it will uncover the display screen of the display unit 3.

Figure 6:
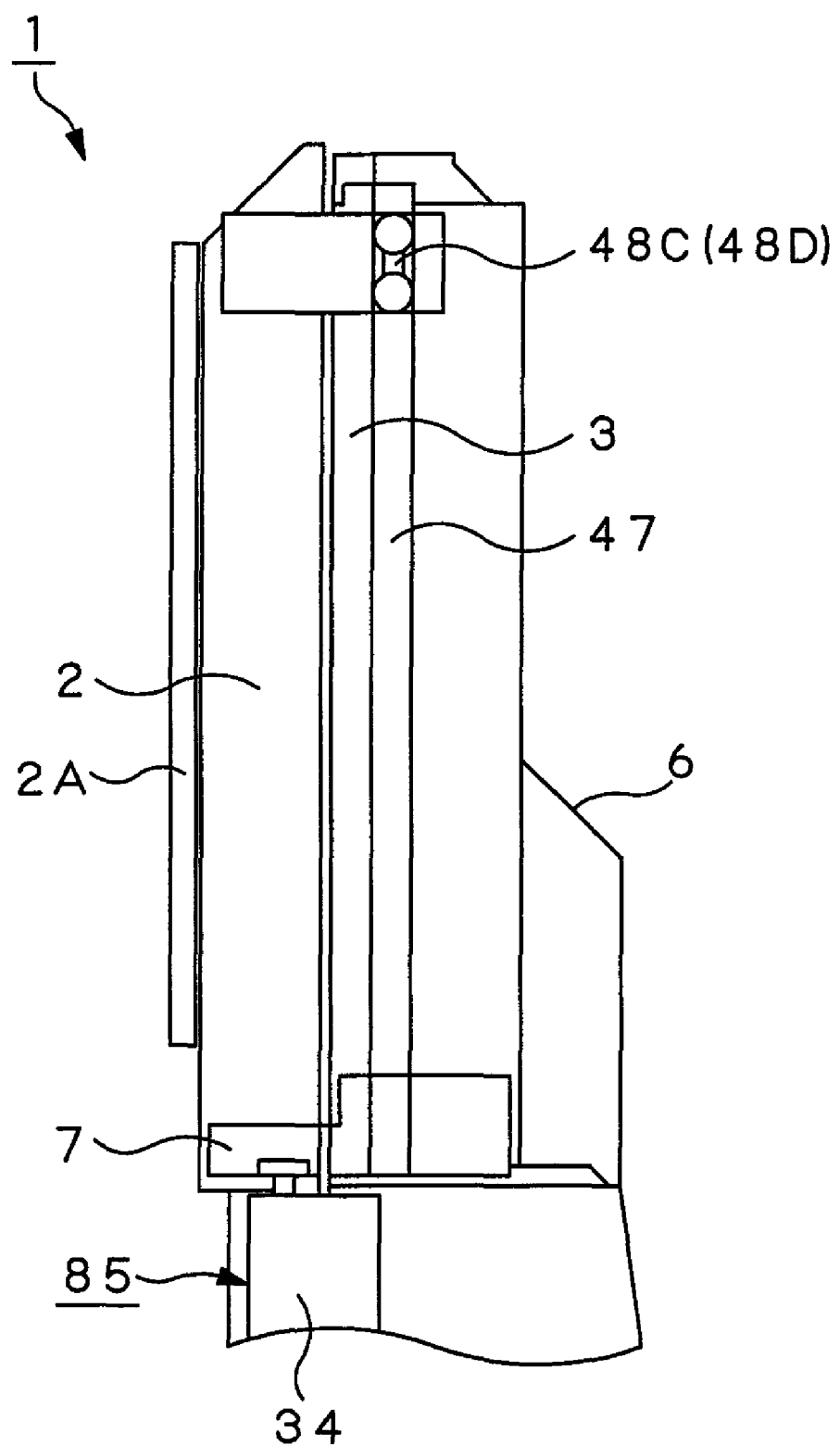
FIG. 6 is a fragmentary side elevation of the audio/display apparatus, showing the audio unit having been moved up to the second position where it covers the liquid crystal display.

Also, as shown in FIGS. 2 and 6, when the audio unit 2 is moved up in relation to the display unit 3 to a second position, it will cover the entire display screen of the display unit 3.

It should be noted that the position of the audio unit 2 in relation to the display unit 3 is changed correspondingly to a selected mode of operation as will be described in detail later.

In the audio/display apparatus 1 as the embodiment of the present invention, ordinary operations of audio unit and television receiver such as power on/off operation, selection among audio mode, display mode and recording medium mode, volume control, channel selection, etc. are made using a remote control device 9. It should be noted that in the audio/display apparatus 1, each of the audio unit 2 and display unit 3 has appropriate operation switches (not shown) provided thereon. In this audio/display apparatus 1, the audio unit 2 is moved vertically with a remote-control signal from the remote control device 9 and also its vertical movement is automatically controlled based on a detection signal from sensors and the like which will be described in detail later.

The audio unit 2 included in the audio/display apparatus 1 reproduces audio information acquired by receiving a radio broadcast, audio information acquired by receiving a television broadcast, audio information sent via a communications network such as the Internet, audio information recorded in a recording medium 84, etc. The display unit 3 reproduces, for display, video information acquired by receiving a television broadcast, radio broadcast or the like, video information sent via a communications network, video information recorded in the recording medium 84, etc.

In the present invention, the video information generically refers to picture information such as moving picture, still picture, character image information, etc. other than audio information.

It should be noted that the audio unit 2 is used only for reproduction of audio information and also used along with the display unit 3 to reproduce audio information synchronously with video information reproduction by the display unit 3. That is, the audio unit 2 and display unit 3 operate in conjunction with each other.

As shown in FIGS. 1 and 2, the audio unit 2 is formed to have a rectangular shape long from side to side and a size large enough to cover the entire front surface (display screen) of the display unit 3 when moved up to the front of the display unit 3. The audio unit 2 has a display 10 and a photodetector 11 to receive a remote-control signal at the upper center. The display 10 appropriately indicates a time, calendar, power on/off state, selected mode of operation, sound volume level, etc. The photodetector 11 receives a remote-control signal from the remote control device 9.

In the upper surface of a housing of the audio unit 2, there is provided a slot 12 through which a recording medium 84 is to be loaded into a recording medium drive unit 14 incorporated in the audio unit 2. It should be noted that only one slot 12 is shown for the simplicity of illustration and explanation but a plurality of slots 12 may be formed for loading a plurality of types of recording media 84 different in size from each other, respectively. Also, the slot 12 may be formed in a lateral surface of the housing depending upon the location of the recording medium drive unit 14 inside the display unit 3.

It should be noted that at the right and left sides of the housing of the audio unit 2, there are provided a right-channel speaker unit 13R and left-channel speaker unit 13L, respectively, for a stereo reproduction of audio signals.

Figure 3:
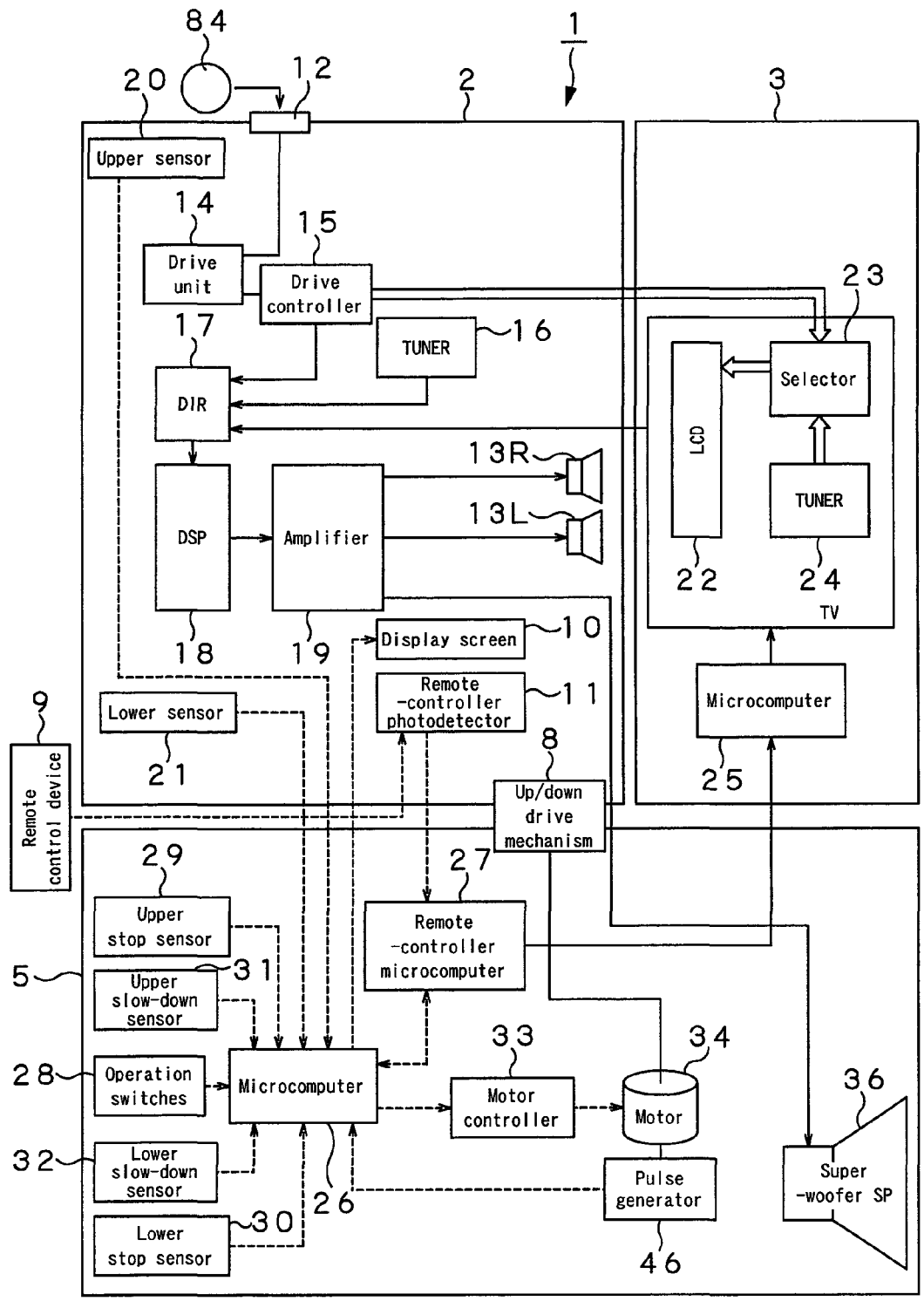
FIG. 3 is a block diagram of the audio/display apparatus.

Also, as shown in FIG. 3, the audio unit 2 has built therein the recording medium drive unit 14 that drives a recording medium 84 loaded through the slot 12 to reproduce audio information, video information and the like recorded in the recording medium 84, and a drive controller 15 to control the operation of the recording medium drive unit 14 and a tuner 16 for reception of radio broadcast etc.

Further, the audio unit 2 incorporates an input selector/decoder (DIR) 17 to select audio signals provided from the drive controller 15, tuner 16 or display unit 3 and process a selected audio signal in a predetermined manner, a sound picture correction circuit (DSP) 18 to adjust the position of a sound picture vertically with the audio unit 2 being set in a first position and second position, respectively, for an optimum output from the speakers 13R and 13L, and an amplifier 19 supply an audio signal output from the DSP 18 at a predetermined level to the speakers 13R and 13L.

It should be noted that the recording medium drive unit 14 included in the audio unit 2 functions to record content information including video and audio information sent by television broadcast and radio broadcast and via a communications network such as the Internet to the recording medium 84 loaded therein or a recording medium incorporated therein, and also functions to reproduce information recorded in the recording medium 84. The video information reproduced by the recording medium drive unit 14 is displayed on the display unit 3 and the audio information is emitted as sound from the audio unit 2 to outside of the apparatus.

The audio unit 2 is moved vertically by the up/down drive mechanism 8 in relation to the display unit 3. However, a foreign matter 71 or the like, if any, caught between the audio and display units 2 and 3 while the audio unit 2 is being moved vertically will possibly damage the components of the apparatus. As will be described in detail later, in order to detect such a foreign matter 71 being caught, the housing of the audio unit 2 has an upper sensor 20 provided at the top thereof and a lower sensor 21 at the bottom of the housing. When any of these upper and lower sensors 20 and 21 detects a foreign matter 71 being caught, the audio unit 2 is immediately stopped from being moved vertically.

Also, a front sheet 2A is installed removably on the front side of the housing of the audio unit 2 via an appropriate holding structure as shown in FIG. 5. The front sheet 2A is formed from a lightweight saran net or the like which will not have any influence on the sound emission from the speakers 13R and 13L and of which the thickness is sufficient to make the inside of the audio unit 2 invisible from outside. Also, the front sheet 2A may appropriately be colored or patterned or may have an appropriate figure attached thereon so as to be harmonious with the atmosphere in the room. When the audio unit 2 is moved to the second position where it covers the front of the display unit 3, the front sheet 2A will effectively improve the appearance of the audio/display apparatus 1.

On the other hand, the display unit 3 is generally equal in functionality to the ordinary television receiver sets, which will not be described in detail. Also, it is connectable to the audio unit 2. The display unit 3 uses a liquid crystal display 22 of a thin structure with a display screen of several tens inches in size. It should be noted that the display unit 3 may use an appropriate other type of thin and large-screen display such as plasma display, not only the liquid crystal display 22.

As shown in FIG. 3, the display unit 3 has built therein a selector 23 to select reproduced information outputted from the drive controller 15 in the audio unit 2. Also, the display unit 3 incorporates a tuner 24 to receive a television broadcast program. Information in a received broadcast program is supplied to the selector 23. In the display unit 3, video information selected by the selector 23 is supplied to the liquid crystal display 22 and a picture is displayed on the display screen of the display 22 while audio signals are supplied to the input selector/decoder 17 in the audio unit 2.

Also, the display unit 3 has installed therein a microcomputer 25 to control the operations of other control circuits, functional circuits (not shown), etc. The microcomputer 25 is supplied with control signals supplied from various operation switches provided on an operation unit (not shown) and a remote-control signal sent from the remote control device 9, processes the supplied signals, and outputs a control signal to each of the apparatus components.

It should be noted that the display screen of the liquid crystal display 22 not in operation is just a dry and tasteless dark screen which will spoil the atmosphere in the room. If the display screen is larger, this problem will be more serious. On this account, when the display unit 3 is not in operation, the audio unit 2 is moved up to the second position before the display unit 3 to cover the display screen of the liquid crystal display 22. Thus, the front sheet 2A of the audio unit 2 will take a most noticeable position and improve the appearance of the apparatus as a whole.

It should be noted here that in the display unit 3 turned on, the power circuit etc. develop heat while the liquid crystal display 22 is displaying a picture. On the other hand, the liquid crystal display 22 has the liquid crystal thereof influenced by heat from the display screen, resulting in a distortion of the picture as well known. In the audio/display apparatus 1, if the display screen of the liquid crystal display 22, displaying a picture, is covered with the audio unit 2, the heat will accumulate between the audio unit 2 and display unit 3 to result in a high temperature which will influence the liquid crystal display 22. The display quality will thus be deteriorated. When the display unit 3 is set for a mode in which the liquid crystal display 22 is to display a picture, the audio unit 2 is controlled not to be moved up to the second position but to be held in the first position where it will not cover the display screen of the liquid crystal display 22.

In the audio/display apparatus 1, the support frame 6 is designed as a structure having a sufficient mechanical strength since it has to support the relatively heavy display unit 3 directly as well as the audio unit 2 via the carrier 7. It is housed in the stand 5 with the columnar support 6B thereof being erected on the base 4 as having previously been described.

Also, in the stand 5, there are laid wires for electrical connection between the audio unit 2 and display unit 3 and also provided the control circuits, power circuit and up/down drive mechanism 8, etc. As shown in FIG. 3, the stand 5 has built therein a microcomputer 26 to control all the control operations and a remote-controller microcomputer 27 to process a remote-control signal sent from the remote control device 9 and detected by the photodetector 11.

Further the stand 5 has provided therein an operation switch unit 28 having a main power switch and sound volume control or various switches, which are to be operated manually, which will not be described in detail. Moreover, the stand 5 has provided therein an upper stop sensor 29 and lower stop sensor 30, upper and lower slow-down sensors 31 and 32, which control the operation of the up/down drive mechanism 8 for moving the audio unit 2 vertically, which will be described in detail later. Further the stand 5 has provided therein a motor controller 33 and drive motor 34 included in the up/down drive mechanism 8, and also a pulse generator 46 to detect the rotation of the drive motor 34.

The upper stop sensor 29 is actuated by the carrier 7 having been moved up to a predetermined position and sends a detection signal to the microcomputer 26 to stop the drive motor 34. The lower stop sensor 30 is actuated by the carrier 7 having been moved down to a predetermined position and sends a detection signal to the microcomputer 26 to stop the drive motor 34. The upper slow-down sensor 31 is actuated by the carrier 7 having been moved up to a predetermined position and sends a detection signal to the microcomputer 26 to lower the moving speed of the carrier 7 by slowing the drive motor 34 down. Also, the lower slow-down sensor 32 is actuated by the carrier 7 having been moved down to a predetermined position and sends a detection signal to the microcomputer 26 to lower the moving speed of the carrier 7 by slowing the drive motor 34 down.

In the audio/display apparatus 1 as the embodiment of the present invention, the above-mentioned sensors 29 to 32 can positively stop the carrier 7 with no shock in the predetermined positions by slowing the carrier 7 down before stopping.

Figure 4:
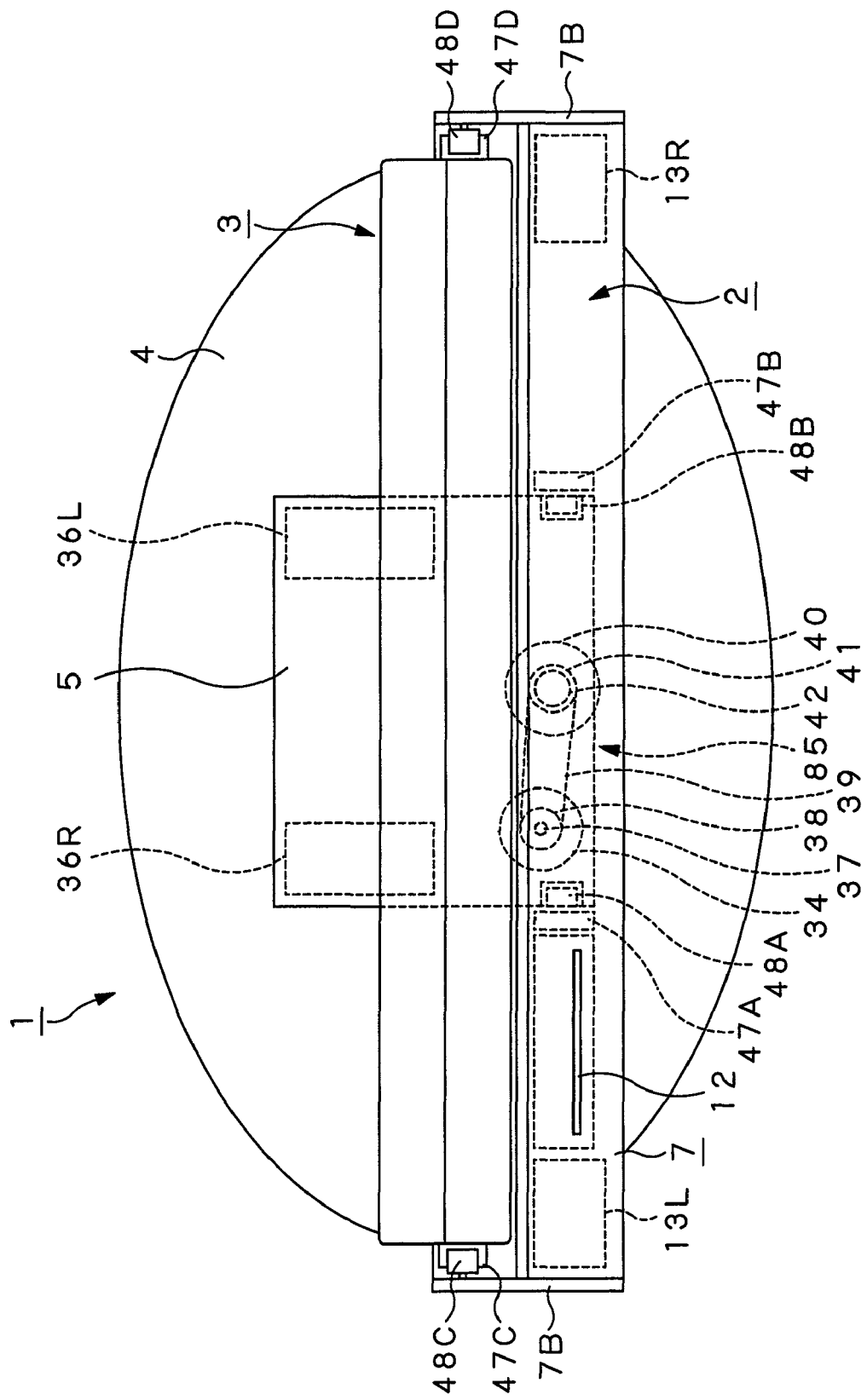
FIG. 4 is a plan view of the audio/display apparatus.

As shown in FIGS. 2 and 4, the stand 5 has built therein a pair of right and left super woofers 36R and 36L disposed with their respective sound emitting parts being directed laterally of the stand 4. The super woofers 36 reproduce audio signals in a low-frequency band. They form, together with the pair of speakers 13R and 13L incorporated in the audio unit 2, a dynamic speaker system that reproduces audio signals, of which the frequencies are in a wide frequency band from low to high, with a good performance of sound reproduction. The super woofers 36R and 36L in pair are large and heavy as compared with the components of the audio unit 2, such as the speakers 13R and 13L. However, since they are provided inside the stand 5, the audio unit 2 may be designed to have a reduced weight.

The audio/display apparatus 1 has the above-mentioned components provided in the audio unit 2, display unit 3 and stand 5 as shown in FIG. 3. However, the arrangement of the components is not limited to the aforementioned one. Basically in this embodiment, a commercially available liquid crystal display 22 is used generally as it is as the display unit 3. However, the audio/display unit 1 may be adapted so that its functions are shared by the audio and display units 2 and 3.

When the audio/display apparatus 1 is set for a predetermined mode of operation, for example, by operating the remote control device 9, the up/down drive mechanism 8 is put into action to move the audio unit 2 vertically in relation to the display unit 3. When the audio/display apparatus 1 is set for a power-off mode, a radio broadcast reception mode or a sound reproduction mode in which an audio signal from a recording medium 84 is to be reproduced, for example, the audio unit 2 is moved to the second position where it will cover the front of the display unit 3. It should be noted that the audio unit 2 may be adapted to be moved down to the first position by operating the remote control device 9.

Also when the audio/display apparatus 1 is set for a television broadcast reception mode in which an picture or the like is to be displayed on the liquid crystal display 22 or a picture reproduction mode in which video information from the recording medium 84 is to be reproduced, the audio unit 2 staying in the second position (upper position) is moved down to the first position where it will uncover the front of the display unit 3. In case the audio/display apparatus 1 is in the display function mode in which the liquid crystal display 22 displays a picture as above, even if an instruction for upward movement of the audio unit 2 is given by operating the remote control device 9, the instruction will be canceled. Therefore, when the display unit 3 is in operation, the audio unit 2 is limited from being moved to the second position where it will be superposed on the display unit 3. Thus, heat is prevented from accumulating between the audio unit 2 and display unit 3, and the liquid crystal display 22 is prevented from being adversely affected by such heat which has possibly accumulated.

Figure 8:
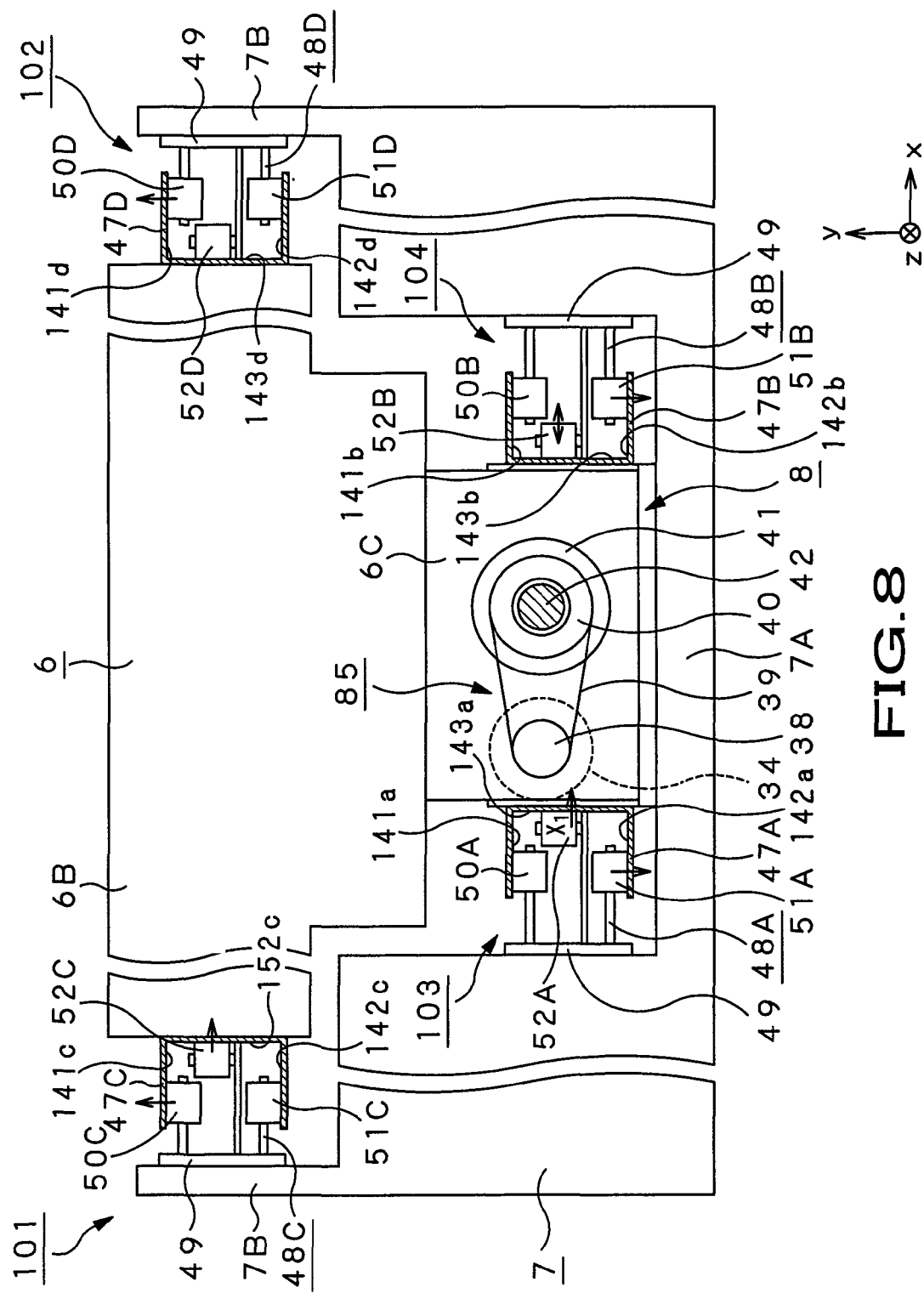
FIG. 8 is a fragmentary plan view of the up/down drive mechanism.

As having previously been described, the stand 5 has provided therein the drive mechanism 85 forming the drive unit of the up/down drive mechanism 8 that moves the audio unit 2 vertically. Namely, the up/down drive mechanism 8 includes the drive mechanism 85 and a plurality of guide rollers 48 to smoothly move the carrier 7 up and down, which will be described in detail later. As shown in FIGS. 4 and 8, the drive mechanism 85 is disposed inside the columnar support 6B of the support frame 6 and on the drive mechanism retainer 6C projecting downward oppositely to an area (corresponding to the profile) where the audio unit 2 is to be positioned. That is, the up/down drive mechanism 8 is constructed for the drive mechanism 85 to be housed in the audio unit 2 when the carrier 7 is down in the first position.

Since the drive mechanism 85 is provided within the area where the audio unit 2 is to be positioned, the audio/display apparatus 1 can be designed smaller. Since the drive mechanism 85 is disposed inside the stand 5, it can be prevented from catching a foreign matter or the like therein and can move the audio unit 2 up and down safely without spoiling the appearance of the audio/display apparatus 1 as a whole.

Also, the audio unit 2 is driven by the drive mechanism 85 including a guide roller mechanism 48 which will be described in detail later to move up and down smoothly and with limited operating noise.

In this audio/display apparatus 1, the drive mechanism 85 of the up/down drive mechanism 8 installed on the support frame 6 is provided inside the stand 5 as above. As shown in FIGS. 4 and 6, a part of the stand 5 is inside the carrier 7 and moved up and down by the up/down drive mechanism 8. As shown in FIG. 8, the carrier 7 includes a frame-shaped portion 7A formed integrally therewith and a pair of sliding guides 7B are formed across the frame-shaped portion 7A to project toward the support frame 6. The stand 5 is located between the sliding guides 7B in pair. On the opposite inner surfaces of sliding guides 7B in pair, there is provided a guide roller mechanism to support the carrier 7 movably in relation to the support frame 6. The drive mechanism 85 is not visible from outside because it is provided inside the stand 5.

Figure 7:
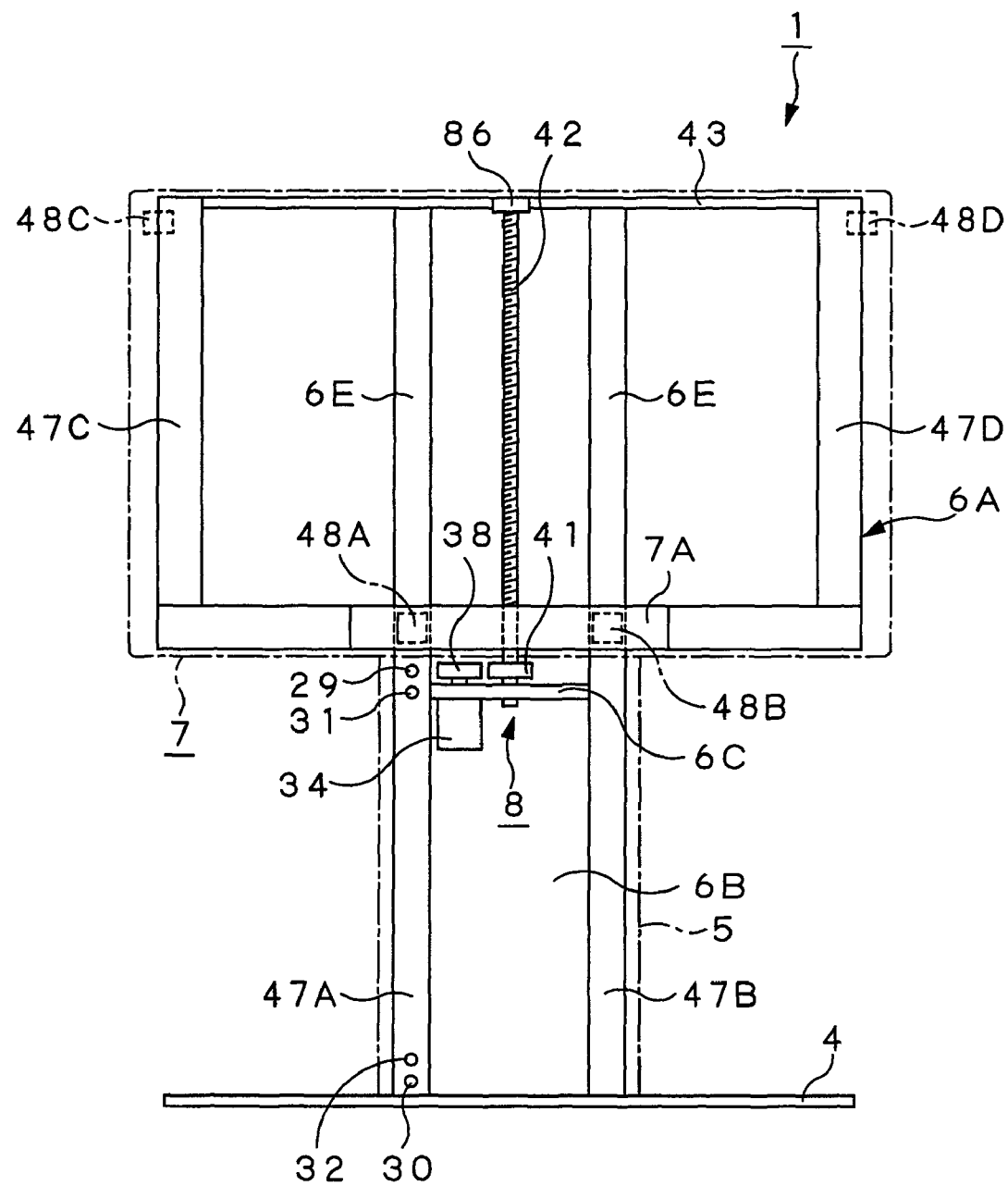
FIG. 7 is a rear view of an up/down drive mechanism for the audio unit.
Figure 9:
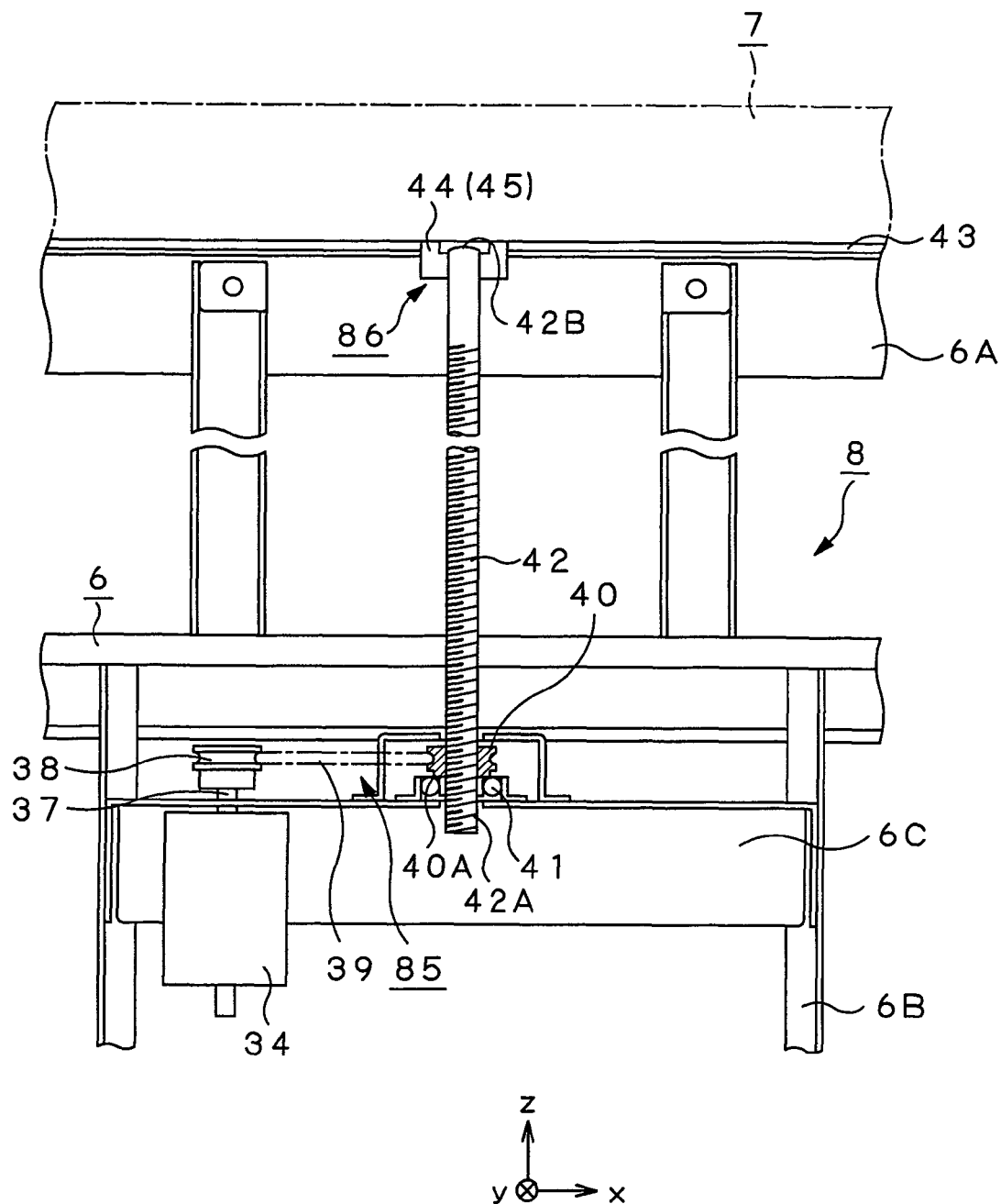
FIG. 9 is also a fragmentary front view of the up/down drive mechanism.

As shown in FIGS. 7 to 9, the drive mechanism 85 is supported on the drive mechanism retainer 6C provided in the support frame 6 and it is disposed inside the stand 5. The drive mechanism 85 includes the drive motor 34 as a drive source, and a drive pulley 38 is fixed to an output shaft 37 of the drive motor 34. The drive mechanism 85 includes, as driven members, a driven belt 39, driven nut 40 having a driven pulley 40A formed integrally therewith, bearing 41 and a feed screw 42. The feed screw 42 is located at the middle of the carrier 7 included in the audio unit 2 and supported perpendicularly to the height of the audio unit 2 along which the audio unit 2 is to be moved.

Figure 10:
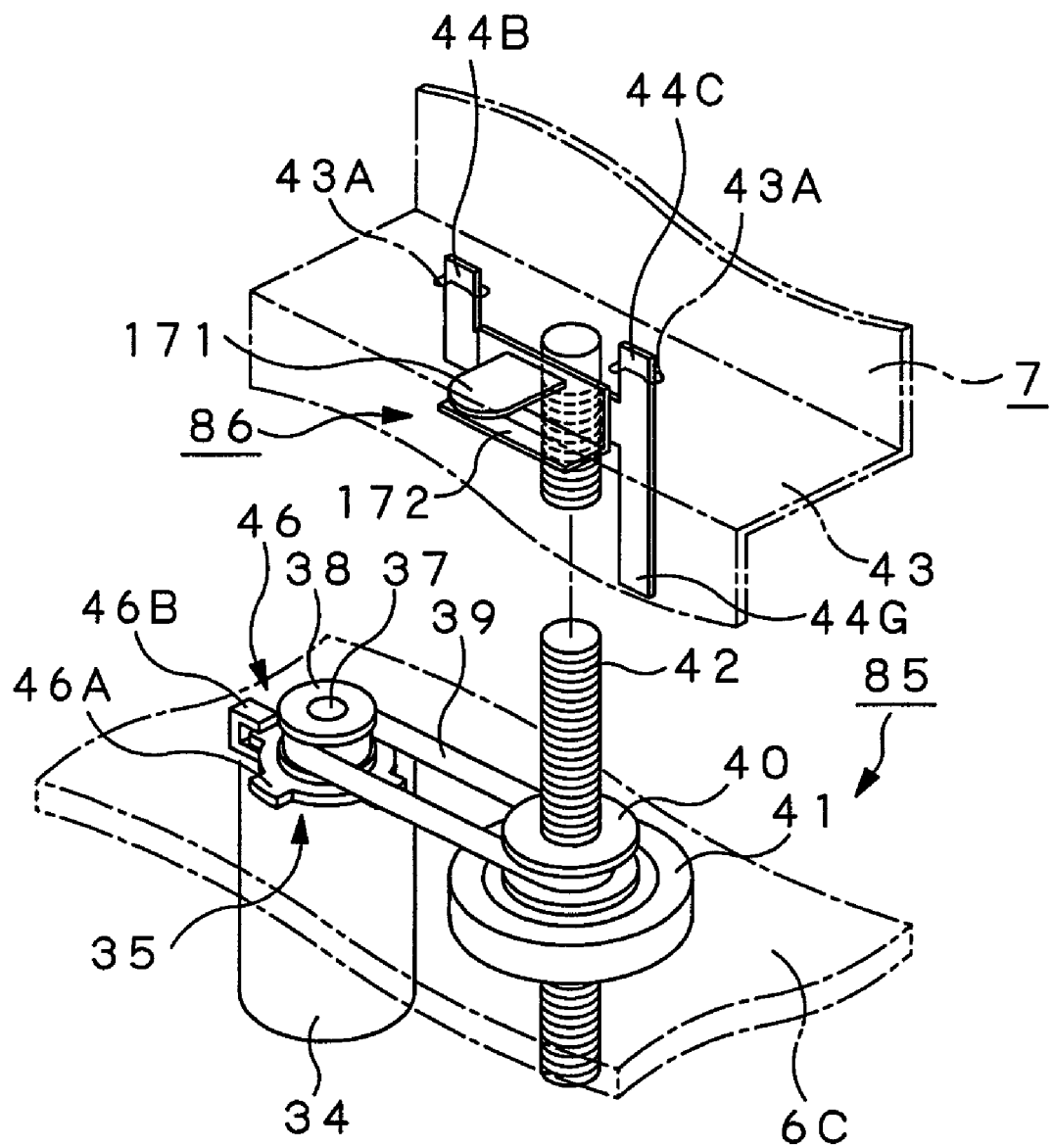
FIG. 10 is a fragmentary perspective view of the up/down drive mechanism.

In the drive mechanism 85, the drive motor 34 is controlled by the aforementioned motor controller 33 to run forward or backward to drive the drive pulley 38 forward or backward. Also, in the drive mechanism 85, the driven belt 39 is extended between, and wound on, the drive pulley 38 and driven pulley 40A to transmit the rotation of the drive motor 34 to the driven nut 40 which will thus be rotated. In the drive mechanism 85, the bearing 41 is installed to the drive mechanism retainer 6C of the support frame 6 via a bracket member as shown in FIGS. 9 and 10. The driven nut 40 is supported rotatably on the feed screw 42 via the bearing 41.

It should be noted here that in the up/down drive mechanism used to move a predetermined carrier vertically, in case a plurality of feed screws or drive nuts is driven simultaneously, they should be rotated synchronously with each other. On this account, the up/down drive mechanism of this type normally uses a pulley having concavities and convexities formed along the periphery thereof and a toothed belt having convexities and concavities formed in the surface thereof where it is in mesh with the pulley. In the drive mechanism constructed as above, the rotation is transmitted by the pulley and drive belt being in engagement at the concavities and convexities thereof with each other. Therefore, no skidding will take place between the pulley and belt, but the engagement between the concavities and convexities will cause a large noise. This drive mechanism will add to the material costs.

It should also be noted here that in the drive mechanism 85, since the rotation of the drive motor 34 is transmitted to the single driven nut 40 via the driven belt 39, it is not necessary to rotate any plurality of members synchronously with each other. The drive mechanism 85 may use a noiseless V belt or the like as the driven belt 39, which will contribute to a reduced material cost.

Figure 12:
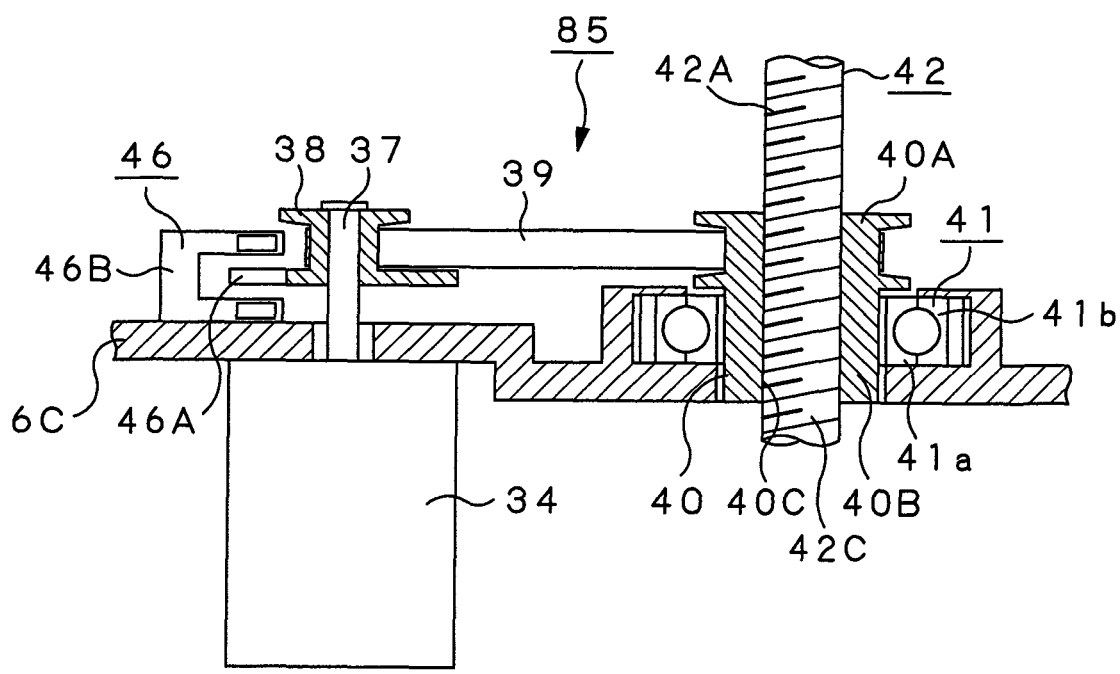
FIG. 12 is a fragmentary sectional view of a drive mechanism for the feed screw.

The driven nut 40 is rotatably supported on the feed screw 42 installed to the carrier 7 of the audio unit 2. The driven nut 40 includes a driven pulley portion 40A and cylindrical base portion 40B. The driven pulley portion 40A is formed integrally on the periphery of the cylindrical base portion 40B as shown in FIG. 12. As seen, the driven nut 40 is a so-called driven pulley. The cylindrical base portion 40B has a through-hole formed therein along the whole length thereof and which is internally threaded (as indicated with a reference numeral 40C). The driven nut 40 is rotated by the driven belt 39 driven by the drive motor 34. In the driven nut 40, the cylindrical base portion 40B is rotatably supported in the bearing 41, and the feed screw 42 is passed through the internally threaded through-hole of the cylindrical base portion 40B.

The feed screw 42 is formed a little longer than a moving distance over which the carrier 7 is moved, namely, a vertical stroke of the audio unit 2 from the first to second position or vice versa. The feed screw 42 has an outside diameter nearly equal to the inside diameter of the through-hole in the cylindrical base portion 40B of the driven nut 40, and it is externally threaded (indicated at a reference numeral 42A) along the entire length thereof. The external thread 42A of the feed screw 42 is in mesh with the internal thread 40C of the through-hole. As the driven nut 40 supported on the drive mechanism retainer 6C of the stationary support frame 6 is rotated by the drive motor 34, the internal thread 40C rotates along the external thread of the feed screw 42. Thus, the feed screw 42 moves axially thereof and the carrier 7 supported on this feed screw 42 is moved up and down along the feed screw 42.

Of the drive mechanism 85, the feed screw 42 is supported at the lower end portion thereof to the stationary support frame 6 via the driven nut 40 and bearing 41, and at the upper end thereof to the movable carrier 7 via the pivot bearing mechanism 86 which will be described in detail later.

Figure 11:
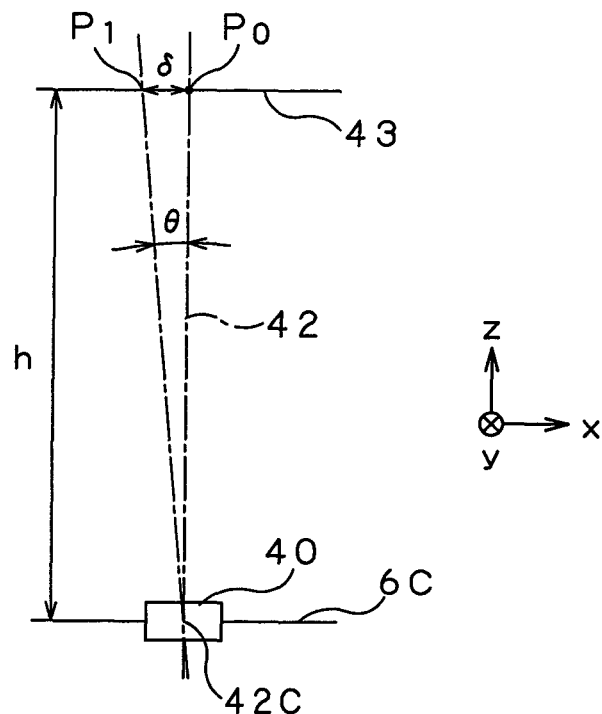
FIG. 11 explains the characteristic of a feed screw.

The upper-end center P1 of the feed screw 42 and that P0 of the driven nut 40 being in mesh with the external thread 42C of the feed screw 42 are positioned in relation to each other depending upon the precision of the carrier 7 and support frame 6. Since the support frame 6 and carrier 7 used in this embodiment are formed each from a combination of many parts, some relative displacement possibly occurs between the support frame 6 and carrier 7. Namely, there will possibly take place a relative displacement δ between the center, at the upper end, of the feed screw 42 and that of the driven nut 40 being in mesh with the external thread 42C of the feed screw 42 as shown in FIG. 11.

As shown in FIGS. 8 to 11, in the audio/display apparatus 1 as the embodiment of the present invention, the position of the carrier 7 in relation to the support frame 6 is limited in the x- and y-axial directions by a plurality of guide roller mechanisms 48A to 48D constructed as will be described in detail later and the carrier 7 is moved vertically with limitation of its angular position about the x-, y- and z-axes.

It should be noted here that the angle of inclination θ of the feed screw 42 varies as the height h changes when the carrier 7 is moved vertically unless there is any displacement δ in relation to the center axis. Therefore, the drive mechanism 85 has to support the feed screw 42 in relation to the support frame 6 and carrier 7 by a structure that will absorb a change of the inclination angle θ. Since the drive mechanism 85 used in this embodiment supports the driven nut 40 rotatably via the bearing 41 as above and there is a small clearance between inner and outer rings 41a and 41b of the bearing 41, the inner and outer rings 41a and 41b are slightly inclinable in relation to each other. Therefore, in the drive mechanism 85, the feed screw 42 on which the driven nut 40 is engaged can also be inclined in relation to the support frame 6 with a certain freedom corresponding to a clearance between the inner and outer rings 41a and 41b of the bearing 41.

It should be noted that in the drive mechanism 85, an upper cross-beam member 43 of the carrier 7 is supported at an upper end of the feed screw 42 via the pivot bearing mechanism 86. Because of this construction, the weight of the carrier 7 supporting the audio unit 2 is supported on the upper end 42B of the feed screw 42. More specifically, the weight of the carrier 7 is transmitted from the upper end 42B of the feed screw 42 to the driven nut 40 and supported on the drive mechanism retainer 6C of the support frame 6 via the bearing 41 supporting the driven nut 40.

As shown in FIGS. 13, 14, 15 and 16, with the upper cross-beam member 43 of the carrier 7 being supported on the upper end 42B of the feed screw 42 via the pivot bearing mechanism 86, the drive mechanism 85 follows up a change, caused by a vertical movement of the carrier 7, of the inclination angle θ of the feed screw 42.

Figure 13:
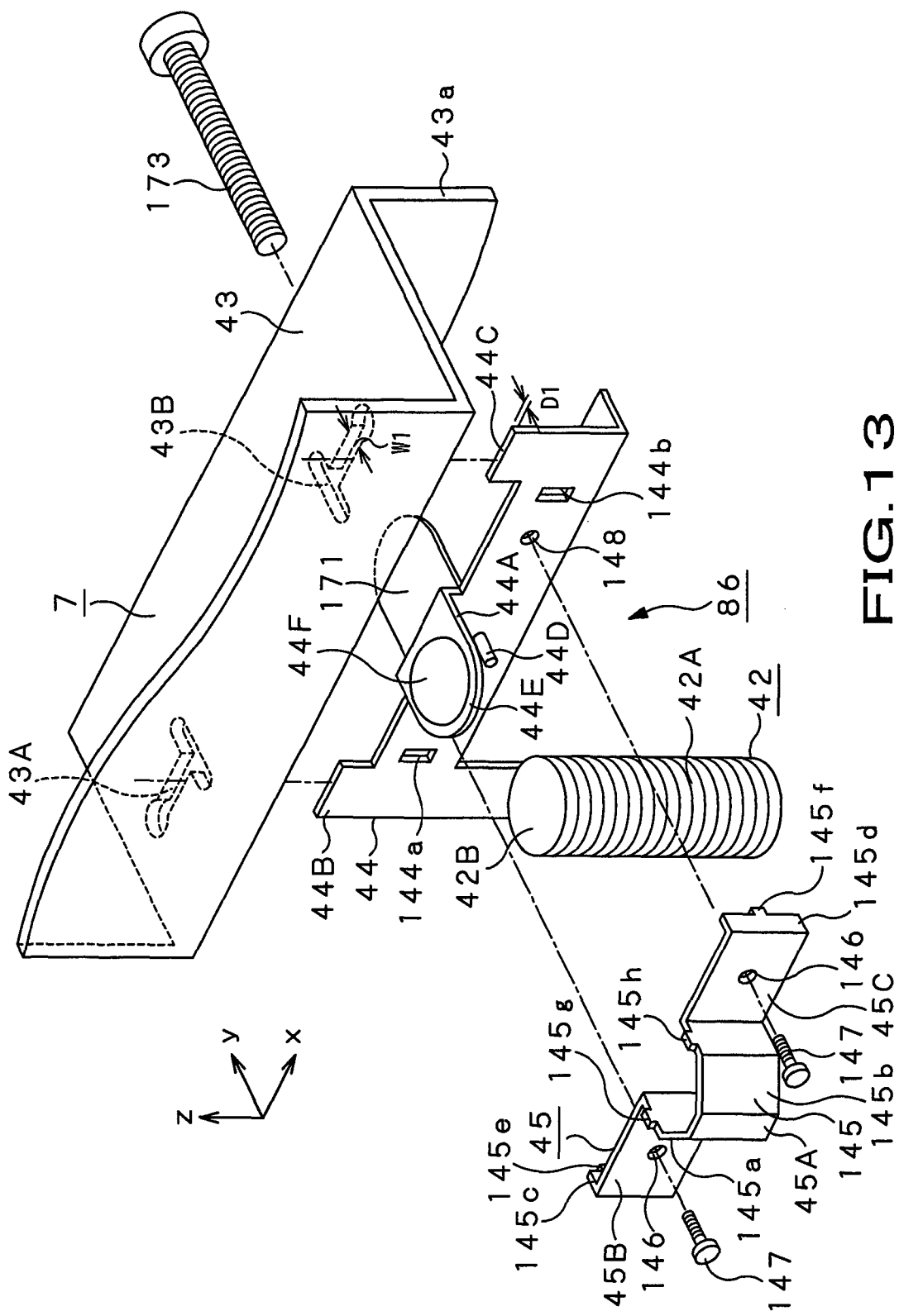
FIG. 13 is an exploded perspective view, from rear, of a pivot bearing mechanism to support the carrier on the feed screw.
Figure 14:
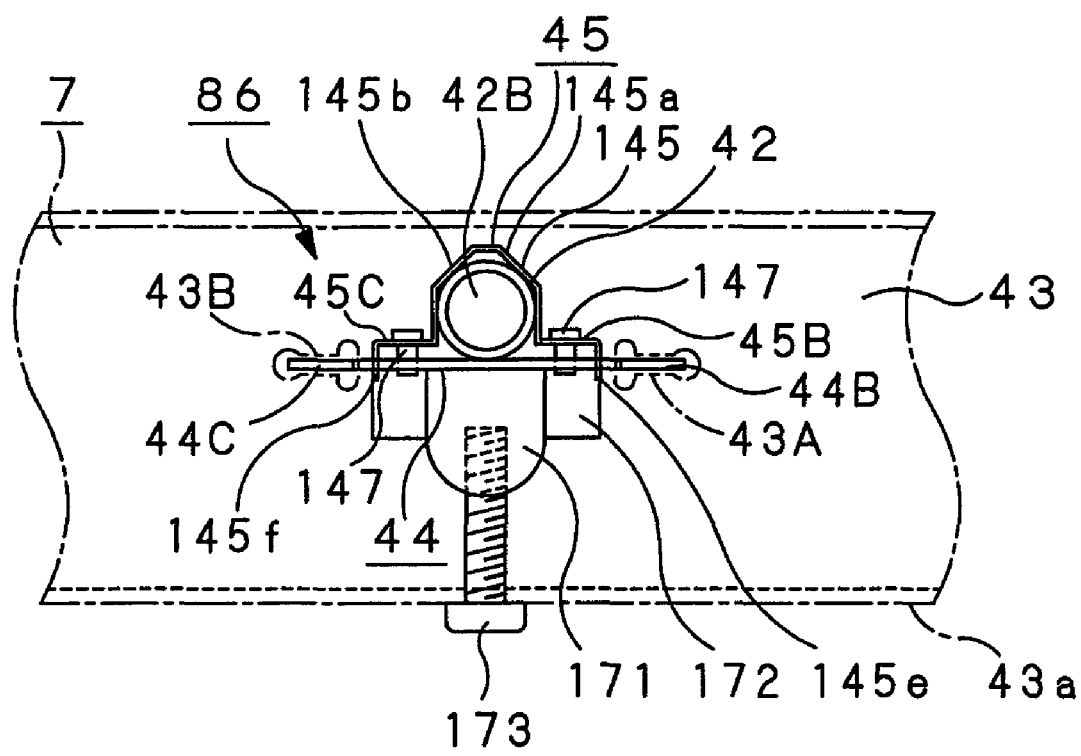
FIG. 14 is a plan view of the pivot bearing mechanism supporting the carrier.

The pivot bearing mechanism 86 via which the upper cross-beam member 43 of the carrier 7 is supported on the upper end 42B of the feed screw 42 is formed from first and second holder members 44 and 45 as shown in FIGS. 13 and 14.

As shown, the pivot bearing mechanism 86 holds the upper-end portion of the feed screw 42 by means of the first and second holder members 44 and 45.

The first holder member 44 has a support piece 44A formed by cutting a material plate for the member 44 and bent to extend horizontally and engagement projections 44B and 44C formed at opposite sides of the support piece 44A. The first holder member 44 has also another engagement projection 44D formed integrally thereon below the support piece 44A. Further, the support piece 44A has formed at the central portion thereof a support 44F convexed upward to have a generally domed shape.

The first holder member 44 is coupled with the upper cross-beam member 43 with the engagement projections 44B and 44C being engaged in engagement holes 43A and 43B, respectively, formed in the upper cross-beam member 43. It should be noted here that the first holder member 44 is not fixed to the upper cross-beam member 43 but it is flexibly coupled to the latter with the engagement projections 44B and 44C being engaged in the engagement holes 43A and 43B, respectively, in the upper cross-beam member 43 as shown in FIGS. 13 and 14. More specifically, each of the engagement holes 43A and 43B is formed to have a width W1 a little larger than the thickness D1 of the engagement projections 44B and 44C. Owing to such engagement holes 43A and 43B, the first holder member 44 is pivotable about the x-axis in FIG. 13 in relation to the upper cross-beam member 43. Adoption of this construction and the pivot bearing mechanism 86 allows the feed screw 42 or carrier 7 to sway about the x- and y-axes in FIG. 13 in relation to the carrier 7 or feed screw 42 while the carrier 7 is being moved vertically, which assures a stable vertical movement of the carrier 7.

It should be noted that with assurance of a precise distance W2 between the engagement holes 43A and 43B in pair and precise distance W3 between the opposite surfaces of the engagement projections 44B and 44C in pair, the engagement projections 44B and 44C can precisely be positioned owing to the engagement holes 43A and 43B, respectively, in the x-axial direction as in FIG. 14.

Figure 15:
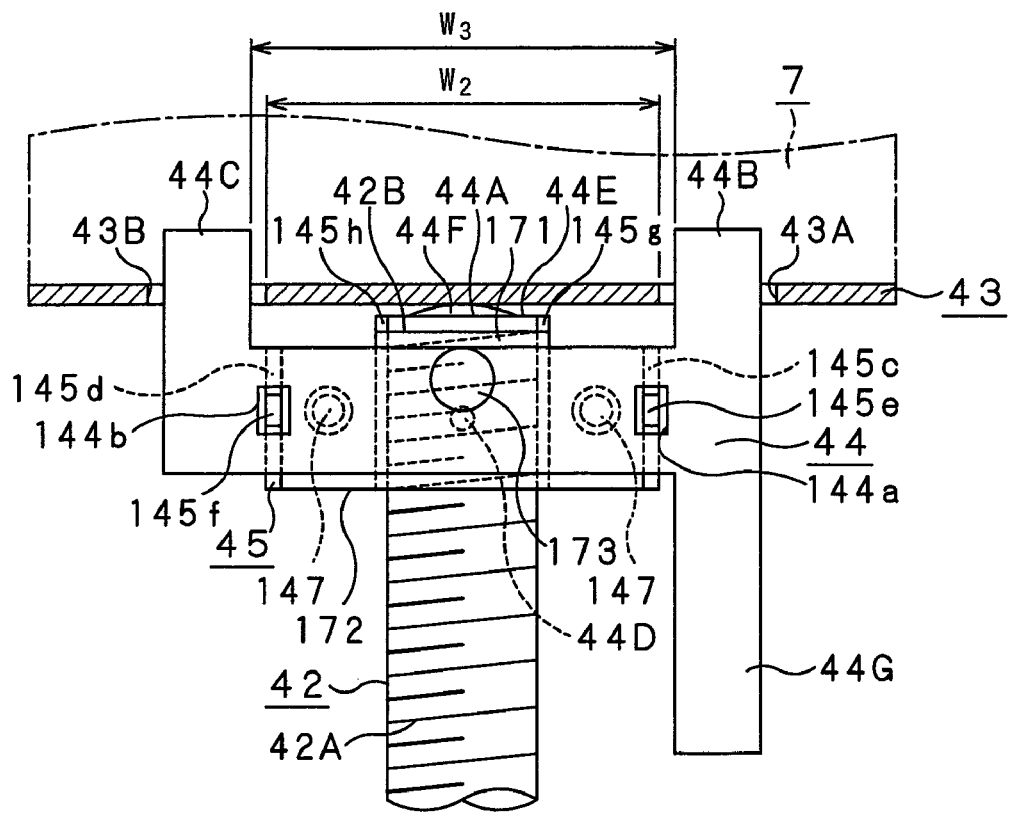
FIG. 15 is also a plan view of the pivot bearing mechanism supporting the carrier.
Figure 16:
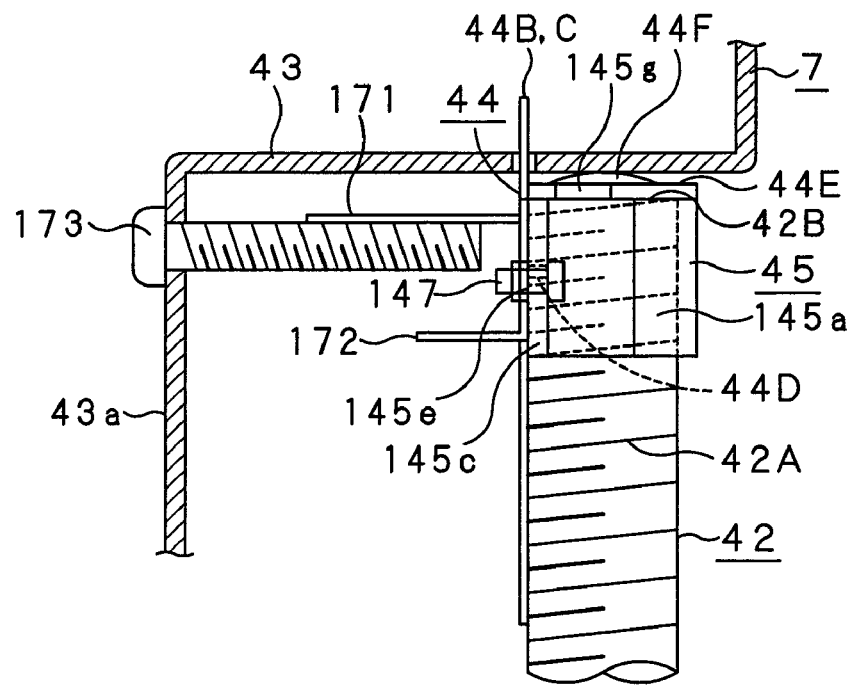
FIG. 16 is a side elevation of the pivot bearing mechanism supporting the carrier.

With the first holder member 44 being installed to the upper cross-beam member 43 as above, a peripheral edge 44E of the domed holding portion 44F formed at the central portion of the support piece 44A is placed on the upper end 42B of the feed screw 42 and the engagement projection 44D is engaged in the external thread 42A on the feed screw 42, as shown in FIGS. 15 and 16.

It should be noted that the first holder member 44 is extended downward at a portion thereof opposite to the engagement portion 44B to form an extension portion 44G. The extension portion 44G is to be detected by each of the sensors 29 to 32 that control the operation of the aforementioned up/down drive mechanism 8.

The second holder member 45 is made by punching and bending a thin metal sheet, and has formed at the center thereof a feed screw fitting portion 145 to hold the outer surface of the feed screw 42 as shown in FIGS. 13 and 14. The feed screw fitting portion 145 is formed to have a pair of pressing support surfaces 145a and 145b that support the outer surface of the feed screw 42 from both side as shown in FIGS. 13 and 14. The pressing support surfaces 145a and 145b are formed wide and oblique at the sides thereof at which the feed screw fitting portion 145 is fitted onto the feed screw 42 as also shown in FIGS. 13 and 14.

Also, the second holder member 45 includes fixing portions 45B and 45C on opposite sides of the feed screw fitting portion 145. The end portions of the fixing portions 45B and 45C are bent to form abutment support pieces 145c and 145d which are supported in abutment by the first holder member 44. At the free ends of the abutment support pieces 145c and 145d, there are formed engagement projections 145e and 145f which are to be engaged in engagement holes 144a and 144b, respectively, formed in the first holder member 44.

The first and second holder members 44 and 45 are placed on the upper end of the feed screw 42 as will be described below.

First, the first holder member 44 is disposed with the support piece 44A being placed on the upper end 42B of the feed screw 42, and the second holder member 45 is put in abutment with the first holder member 44 with the feed screw 42 being laid between them. In this condition, the feed screw 42 is fitted in the feed screw fitting portion 145 of the second holder member 45.

When the first and second holder members 44 and 45 are thus put in abutment with each other, the engagement projections 145e and 145f are engaged into the respective engagement holes 144a and 144b.

Also, when the first and second holder members 44 and 45 are put in abutment with each other, the free ends of the abutment support pieces 145c and 145d will abut one side of the first holder member 44 while the fixing portions 45B and 45C will be at a predetermined distance from the one side of the first holder member 44.

It should also be noted that fixing screws 147 are inserted in screw holes 146 formed in the fixing portions 45B and 45C, respectively. As the fixing screws 147 are driven into the screw holes 148, respectively, formed in the first holder member 44, the fixing portions 45B and 45C are fixed to the first holder member 44 while being elastically deformed and the pair of pressing support surfaces 145a and 145b is thus pressed to the outer surface of the feed screw 42, as shown in FIG. 14. Since the pressing support surfaces 145a and 145b in pair are pressed to the outer surface of the feed screw 42 under the effect of a resilience developed as the fixing portions 45B and 45C are elastically deformed, the first and second holder members 44 and 45 can hold the feed screw 42 with a large force. Namely, the first and second holder members 44 and 45 can positively be fitted on the feed screw 42.

As above, the first and second holder members 44 and 45 support the feed screw 42 at three points including the flat surface of the first holder member 44 and the pair of oblique pressing support surfaces 145a and 145b of the second holder member 45. Namely, the first and second holder members 44 and 45 can be installed in parallel with the axis of the feed screw 42.

As above, the feed screw 42 is held by the first and second holder members 44 and 45. When the first and second holder members 44 and 45 are combined together, the engagement projections 145e and 145f of the second holder member 45 are engaged in the engagement holes 144a and 144b, respectively, in the first holder member 44 and thus the pressing support surfaces 145a and 145b in pair are pressed to the outer surface of the feed screw 42. The precision of y-axial positioning of the feed screw 42 as in FIG. 14 is transmitted to the first holder member 44. As a result, the first holder member 44 is controlled in precision of y-axial positioning similarly to the second holder member 45 as shown in FIG. 14.

Also, as shown in FIG. 14, when the first and second holder members 44 and 45 are combined in abutment with each other, the pair of support pieces 145g and 145h projected from the upper end of the feed screw fitting portion 145 of the second holder member 45 projects to both sides, respectively, of the support piece 44A to limit the x-axial movement of the support piece 44A as shown in FIG. 14.

The pivot bearing mechanism 86 constructed as above holds the upper end 42B of the feed screw 42 by the peripheral edge 44E of the domed holding portion 44A of the first holder member 44, and the outer surface of the feed screw 42 by the first holder member 44 and the feed screw fitting portion 145 of the second holder member 45.

The pivot bearing mechanism 86 placed on the upper end of the feed screw 42 supports the upper cross-beam member 43 of the carrier 7 by the domed holding portion 44F formed in the center of the support piece 44A, and the peripheral edge 44E of the support piece 44A is supported on the upper end 42B of the feed screw 42. Since the weight of the heavy carrier 7 is supported in point contact on the upper end 42B of the feed screw 42, the pivot bearing mechanism 86 can hold the heavy carrier 7 positively and stably even if the latter is swaying during vertical movement.

Namely, in the pivot bearing mechanism 86, since the upper cross-beam member 43 is supported in point contact on the generally domed holding portion 44F formed in the center of the support piece 44A, a certain degree of inclination, about the x- and y-axes in FIG. 16, of the upper cross-beam member 43 or feed screw 42 in relation to each other is allowable.

Also, since the first and second holder members 44 and 45 supported on the feed screw 42 are prevented from being disengaged from the feed screw 42 and can be positively installed in position because the engagement projection 44D provided on the first holder member 44 is engaged on the external thread 42A of the feed screw 42.

In the pivot bearing mechanism 86 constructed as above, since the engagement projections 44B and 44C of the first holder member 44 are engaged in the engagement holes 43A and 43B formed in the upper cross-beam member 43 as shown in FIGS. 15 and 16, the first holder member is prevented from being turned about the x-axis in FIG. 14. Further, since the feed screw 42 is held tight between the first and second holder members 44 and 45 and thus integral with the pivot bearing mechanism 86, it is prevented from being rotated even if applied with a force for rotation about the z-axis. Therefore, the pivot bearing mechanism 86 limits the position of the feed screw 42 in the x-, y- and z-axial directions in relation to the carrier 7, and allows the feed screw 42 to rotate about the x- and y-axes to a certain degree while disabling the feed screw 42 from rotating about the z-axis.

As above, the carrier 7 supported on the pivot bearing mechanism 86 installed on the single feed screw 42 and vertically movable along with the feed screw 42 is supported on the upper end 42B of the feed screw 42. So, the carrier 7 is removable to above the feed screw 42. In this embodiment, parts of the first holder member 44 included in the pivot bearing mechanism 86 are bent to form a pair of retaining portions 171 and 172 as shown in FIG. 16. A shaft-shaped retaining member 173 is inserted from a front side 43a of the upper cross-beam member 43 of the carrier 7 and engaged in between the retaining portions 171 and 172, whereby the carrier 7 can be inhibited from being disengaged from on the feed screw 42. It should be noted that the carrier 7 can be removed from on the feed screw 42 by removing the retaining member 173.

Also, the drive mechanism 85 includes a pulse generating mechanism 46 that detects a rotation of the drive motor 34 and generates a rotation pulse. The pulse generating mechanism 46 includes a disc 46A installed rotatably along with the drive pulley 38 installed to the output shaft 37, and a pulse generator 46B disposed on the periphery of the disc 46A as shown in FIG. 10. The disc 46A is formed from a light-shielding material and has a plurality of slits formed circumferentially at predetermined intervals.

The pulse generator 46B includes a light-emitting element and light-detecting element laid across the peripheral edge of the disc 46A. When the drive motor 34 is put into operation and the disk 46A is rotated, the light-detecting element of the pulse generating mechanism 46 intermittently detects light emitted from the light-emitting element and having passed through the slits to generate a pulse. The pulse signal is supplied to the microcomputer 26 for use to control the driving operation of the drive mechanism 85.

In the drive mechanism 85 constructed as above, when the drive motor 34 is put into operation, the drive pulley 38 installed to the output shaft 37 is rotated and the driven nut 40 is rotated via the driven belt 39 wound on the drive pulley 38. As the driven nut 40 is rotated, the feed screw 42 is moved axially. When the feed screw 42 is moved axially as the rotating driven nut 40 is rotated, the carrier 7 supported on the feed screw 42 is moved along with the feed screw 42 axially of the feed screw 42.

In the audio/display apparatus 1, as the drive mechanism 85 is driven, the audio unit 2 on the carrier 7 is moved vertically in relation to the display unit 3 supported on the support frame 6. That is, the audio unit 2 is moved by the drive mechanism 85 between the first position where it will uncover the display screen of the display unit 3 and the second position where it will be superposed on the display unit 3 and thus cover the display screen.

The audio/display apparatus 1 further includes a travel guide mechanism as shown in FIG. 8. The travel guide mechanism permits the audio unit 2 having a sufficient size to cover the entire display screen of the display unit 3 to move up and down stably and smoothly in relation to the display unit 3. The travel guide mechanism includes first, second, third and fourth guide rails 47A, 47B, 47C and 47D provided in the height direction of the support frame 6 supporting the stationary display unit 3, and first, second, third and fourth guide roller mechanisms 48A, 48B, 48C and 48D installed to the vertically-movable carrier 7 supporting the audio unit 2 to travel under the guidance of the guide rails 47A, 47B, 47C and 47D, respectively.

More specifically, the travel guide mechanism includes first and second upper travel guide mechanisms 101 and 102 provided at opposite lateral sides of the frame-shaped body 6A of the support frame 6, and first and second lower travel guide mechanisms 103 and 104 provided on the columnar support 6B inside the stand 5. These first and second upper travel guide mechanisms 101 and 102 and first and second lower travel guide mechanisms 103 and 104 are disposed in different front and rear positions and right and left positions, respectively, in relation to the support frame 6, so that the carrier 7 can be moved up and down stably.

The first guide rail 47A included in the first lower travel guide mechanism 103 and second guide rail 47B included in the second lower travel guide mechanism 104 are disposed at opposite positions inside the stand 5 to extend in the height direction of the support frame 6 as shown in FIGS. 7 and 8. The third guide rail 47C included in the first upper travel guide mechanism 101 and fourth guide rail 47D included in the second upper travel guide mechanism 102 are disposed at opposite sides of the frame-shaped body 6A of the support frame 6 as shown in FIGS. 7 and 8.

It should be noted that the frame-shaped body 6A of the support frame 6 includes a pair of reinforcing support members 6E provided nearly in the center thereof to assure the strength of the frame-shaped body 6A.

The first and second guide rails 47A and 47B are disposed across the drive mechanism 85 as shown in FIGS. 4 and 8, On the other hand, the third and fourth guide rails 47C and 47D are disposed outside and behind the first and second guide rails 47A and 47B.

As shown in FIG. 8, each of the guide rails 47A to 47D is formed to have a C-shaped section open along the entire length at the side thereof opposite to the carrier 7, and a roller included in each of the guide roller mechanisms 48A to 48D is so disposed inside a corresponding one of the guide rails that it will be able to roll along the guide rail.

The first to fourth guide roller mechanisms 48A to 48D used in this embodiment are constructed to guide the carrier 7, which is moved up and down in relation to the support frame 6, by limiting the x- and y-axial positions of the carrier 7 and the angular positions about the x-, y- and z-axes as shown in FIG. 8.

Inside the columnar support 6B of the support frame 6, there are provided position sensors 29, 30, 31 and 32 to detect the position of the carrier 7 as shown in FIG. 7. These position sensors 29, 30, 31 and 32 are formed each from a mechanical switch, contactless optical switch or the like.

The first, second, third and fourth guide roller mechanisms 48A, 48B, 48C and 48D included in the travel guide mechanisms 101 to 104, respectively, supporting the carrier 7 to be movable vertically in relation to the support frame 6 are generally equal in basic construction to each other. As shown in FIGS. 8 and 15, the first, second, third and fourth guide roller mechanisms 48A, 48B, 48C and 48D include first rollers 50A, 50B, 50C and 50D which are guided by first walls 141a, 141b, 141c and 141d, respectively, of the first to fourth guide rails 47A, 47B, 47C and 47D each having C-shaped section, second rollers 51A, 51B, 51C and 51D which are guided by second walls 142a, 142b, 142c and 142d, respectively, formed in parallel oppositely to the first walls 141a, 141b, 141c and 141d, respectively, and third rollers 52A, 52B, 52C and 52D which are guided by third walls 143a, 143b, 143c and 143d, respectively, perpendicular to the first walls 141a, 141b, 141c and 141d and second walls 142a, 142b, 142c and 142d, respectively.

As shown in FIG. 8, the first rollers 50A, 50B, 50C and 50D and second rollers 51A, 51B, 51C and 51D are installed for their axes of rotation to be parallel to each other, and the third rollers 52A, 52B, 52C and 52D are installed for their axes of rotation to be perpendicular to those of the first rollers 50A, 50B, 50C and 50D and second rollers 51A, 51B, 51C and 51D.

It should be noted that the first to fourth guide roller mechanisms 48A, 48B, 48C and 48D are installed via the support brackets 49, respectively, fixed to the carrier 7 oppositely to the first to fourth guide rails 47A, 47B, 47C and 47D.

Here will be described in detail the first guide roller mechanism 48A included in the first lower travel guide mechanism 103, second guide roller mechanism 48B in the second lower travel guide mechanism 104, third guide roller mechanism 48C in the first upper travel guide mechanism 101 and fourth guide roller mechanism 48D in the second upper travel guide mechanism 102.

Figure 18A:
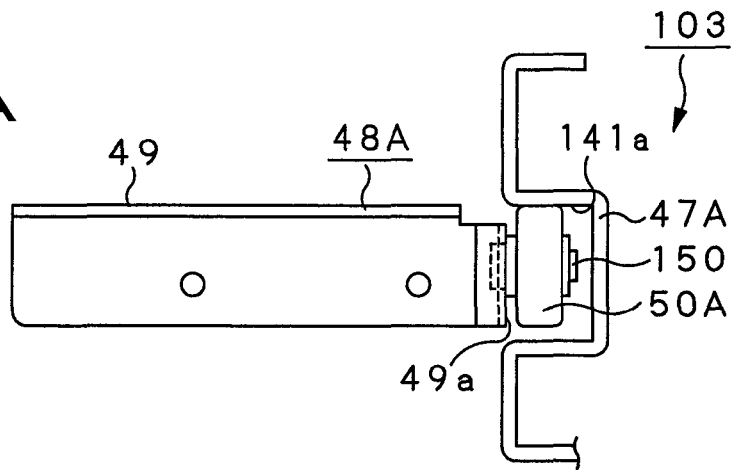
FIG. 18A is a side elevation of a first guide roller installed in place.
Figure 18B:
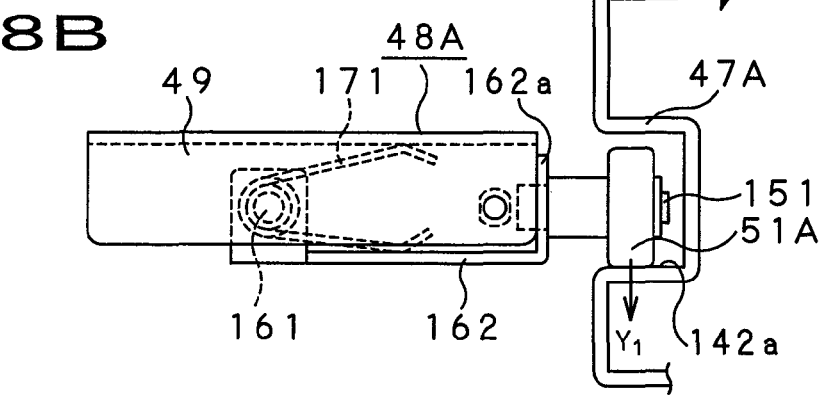
FIG. 18B is a side elevation of a second guide roller installed in place and FIG. 18C is a side elevation of a third guide roller installed in place.
Figure 18C:
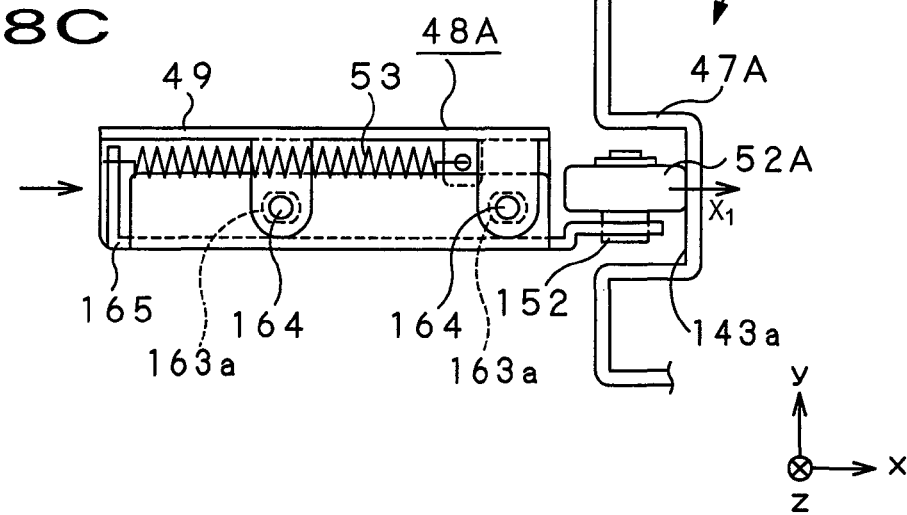

As shown in FIGS. 18A, 18B and 18C, the first guide roller mechanism 48A included in the first lower travel guide mechanism 103 includes first, second and third rollers 50A, 51A and 52A each installed to the support bracket 49. More specifically, the first roller 50A is so installed on a spindle 150 set on a support piece 49a formed by bending the free end portion of the support bracket 49 that it will roll on a first wall 141a of the first guide rail 47A.

Also, the second roller 51A is installed to the support bracket 49 via a pivoting support plate 162 supported pivotably on a fixing shaft 161 provided on the support bracket 49. More specifically, the second roller 51A is installed on a spindle 151 set on a support piece 162a formed by bending the free end portion of the pivoting support plate 162. The pivoting support plate 162 is forced to pivot in the direction of arrow Y1 in FIG. 18B by a helical torsion spring 163 supported on the fixing shaft 161 and extending between the support bracket 49 and pivoting support plate 162, so that the second roller 51A will be forced to roll on a second wall 142a of the first guide rail 47A.

Further, the third roller 52A is installed on a spindle 153 set on the free end portion of a sliding support plate 165 installed to the support bracket 49 movably toward and away from the latter. It should be noted that the sliding support plate 165 has elongated holes 163a formed therein and fixing shafts 164 set on the support bracket 49 are inserted in the elongated holes 163a, respectively. Namely, the sliding support plate 165 is supported movably toward and away from the support bracket 49. Also, the sliding support plate 165 is forced by a helical tension spring 53 provided between the pivoting support plate 165 and support bracket 49 to move in the direction of arrow X1 in FIG. 18C in which the third roller 52A is projected from the support bracket 49. When the sliding support plate 165 is forced in the direction of arrow X1, the third roller 52A will be forced to roll on a third wall 143a of the first guide rail 47A.

Figure 19A:
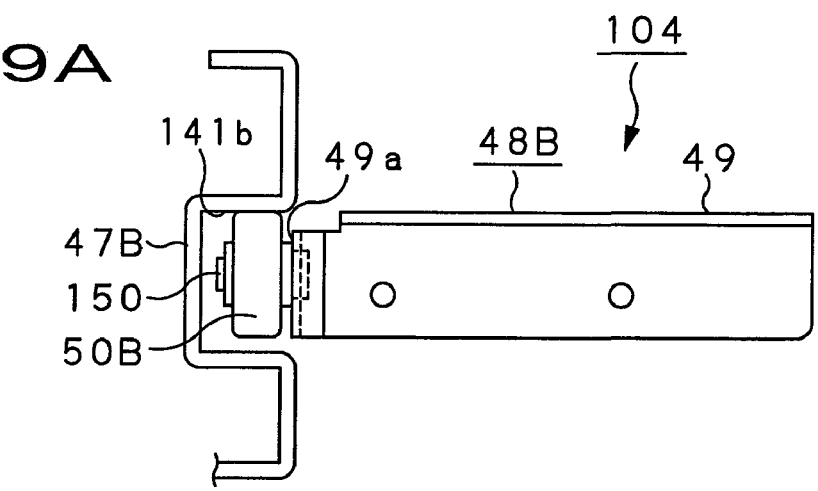
FIG. 19A is a side elevation of a first guide roller installed in place.
Figure 19B:
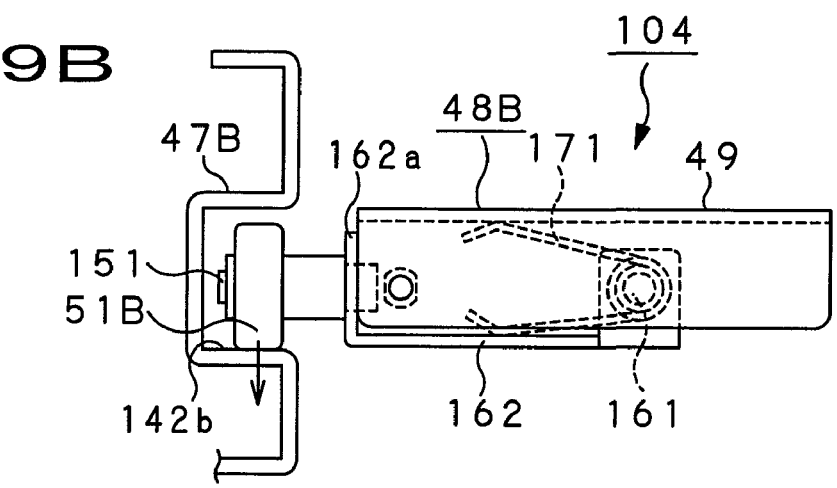
FIG. 19B is a side elevation of a second guide roller installed in place and FIG. 19C is a side elevation of a third guide roller installed in place.
Figure 19C:
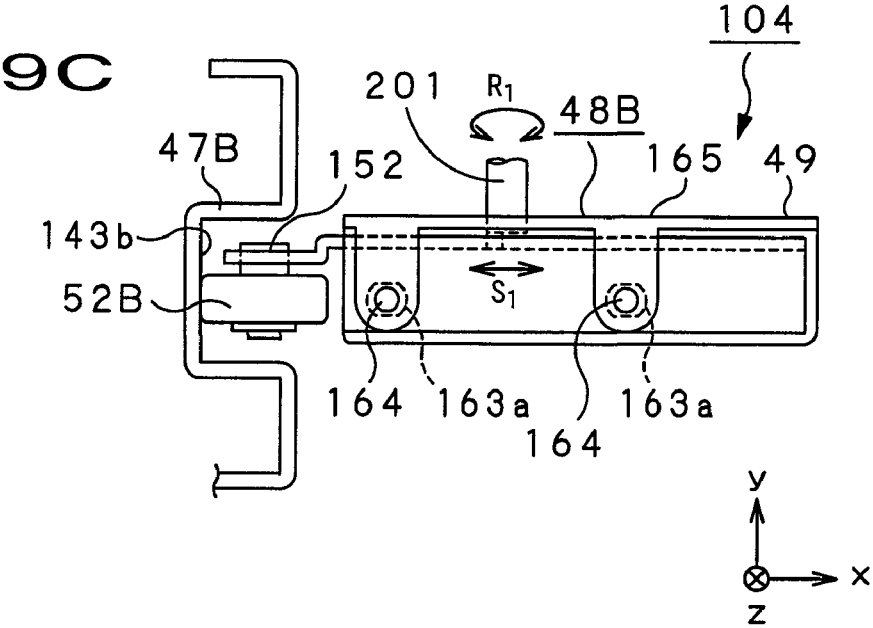

As shown in FIGS. 19A, 19B and 19C, the second guide roller mechanism 48B included in the second lower travel guide mechanism 104 includes first to third rollers 50B, 51B and 52B each installed to the support bracket 49. More specifically, the first roller 50B is so installed on a spindle 150 set on a support piece 49a formed by bending the free end portion of the support bracket 49 that it will roll on a first wall 141b of the second guide rail 47B.

Also, the second roller 51B is installed to the support bracket 49 via a pivoting support plate 162 supported pivotably on a fixing shaft 161 provided on the support bracket 49. More specifically, the second roller 51B is installed on a spindle 151 set on a support piece 162a formed by bending the free end portion of the support plate 162. The pivoting support plate 162 is forced to pivot in the direction of arrow Y1 in FIG. 19B by a helical torsion spring 163 provided on the fixing shaft 161 and extending between the support bracket 49 and pivoting support plate 162, so that the second roller 51B will be forced to roll on a second wall 142b of the second guide rail 47B.

Figure 17:
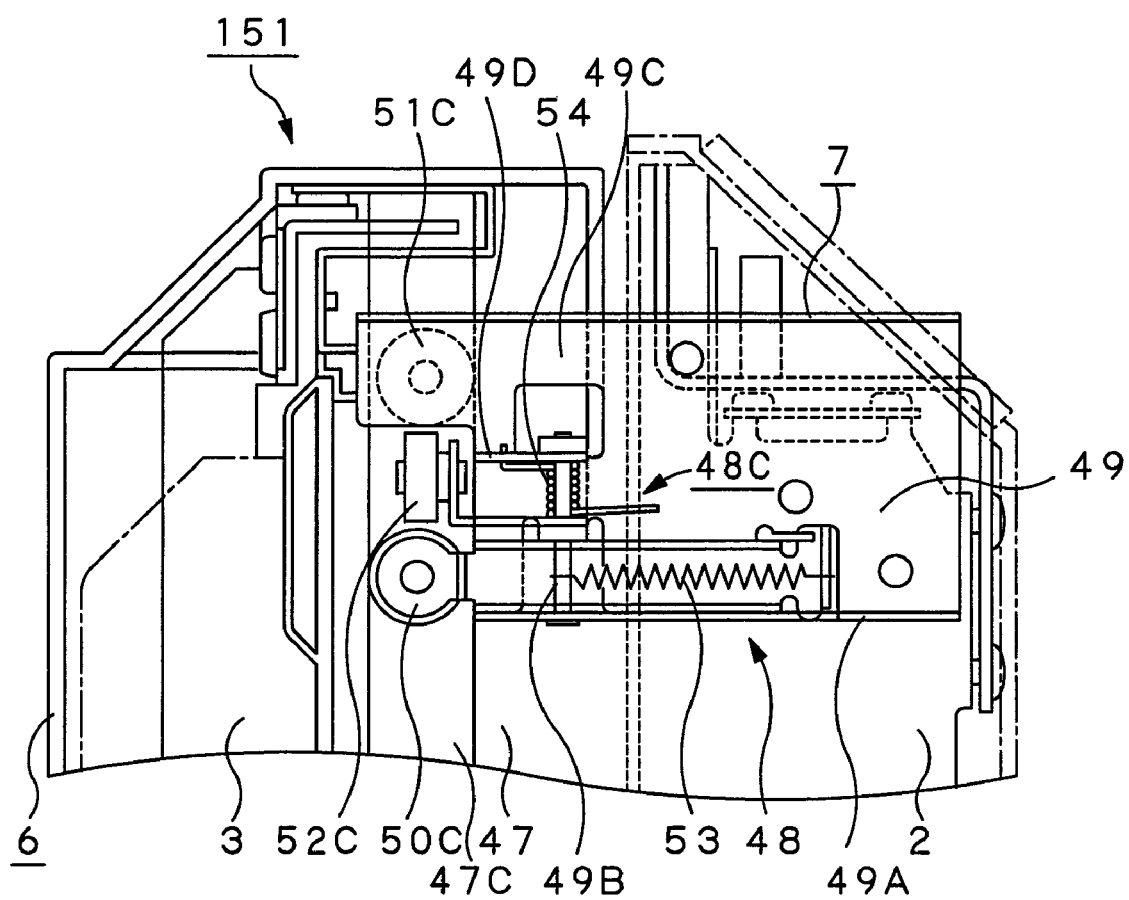
FIG. 17 is a fragmentary side elevation showing a third guide roller mechanism to support the audio unit movably.

Further, the third roller 52B is installed on a spindle 152 set on the free end portion of a sliding support plate 165 installed to the support bracket 49 movably toward and away from the latter, and is in contact with a third wall 143b of the second guide rail 47B. It should be noted that the sliding support plate 165 has elongated holes 163a formed therein and fixing shafts 164 set on the support bracket 49 are inserted in the elongated holes 163a, respectively. Namely, the sliding support plate 165 is supported movably toward and away from the support bracket 49 to adjust the contact of the third roller 52B with the third wall 143b. By turning an eccentric driver 201 inserted through a through-hole formed in the support bracket 49 in the direction of arrow R1 in FIG. 17B, the sliding support plate 165 is moved in the direction of arrow S1 in FIG. 19B, thereby permitting to adjust the x-axial projection of the third roller 52B in relation to the support bracket 49.

Next, the third guide roller mechanism 48C included in the first upper travel guide mechanism 101 will be explained. As shown in FIGS. 20A, 20B and 20C, the third guide roller mechanism 48C includes first to third rollers 50C, 51C and 52C each installed to the support bracket 49. More specifically, the first roller 50C is installed on a spindle 150 set on the free end portion of a sliding support plate 165 installed movably toward and away from the support bracket 49. It should be noted that the sliding support plate 165 is forced by a helical tension spring 53 provided between the sliding support plate 165 and support bracket 49 to move in the direction of arrow Y2 in FIG. 20A in which the first roller 50C is projected from the support bracket 49. Thus, the first roller 50C will be forced to roll on a first wall 141c of the third guide rail 47C.

As shown in FIG. 20B, the second roller 51C is so installed on a spindle 151 set on the free end portion of the support bracket 49 that it will roll on a second wall 142c of the third guide rail 47C.

Further, the third roller 52C is installed to the support bracket 49 via a pivoting support plate 162 supported movably on a fixing shaft 161 provided on the support bracket 49. That is, the third roller 52C is installed on a spindle 152 set on a support piece 162a formed by bending the free end portion of the pivoting support plate 162. The pivoting support plate 162 is forced to pivot in the direction of arrow X1 in FIG. 20C by a helical torsion spring 163 supported on the fixing shaft 161 and extending between the support bracket 49 and pivoting support plate 162, so that the third roller 52C will be forced to roll on a third wall 143c of the third guide rail 47C.

Further, the fourth guide roller mechanism 48D included in the second upper travel guide mechanism 102 will be explained herebelow. The fourth guide roller mechanism 48D includes first to third rollers 50D, 51D and 52D installed to the support bracket 49 as shown in FIGS. 21A, 21B and 21C.

In the fourth guide roller mechanism 48D, the first roller 50D is installed on a spindle 150 set on the free end portion of a sliding support plate 165 installed to the support bracket 49 movably toward and away from the latter. More specifically, the sliding support plate 165 is forced by a helical tension spring 53 provided between the sliding support plate 165 and support bracket 49 to move in the direction of arrow Y2 in FIG. 21A in which the first roller 50C is projected from the support bracket 49. When the sliding support plate 165 is forced in the direction of arrow Y2, the first roller 50D is forced to roll on a first wall 141d of the fourth guide rail 47D.

Figures 21A, 21B, 21C:
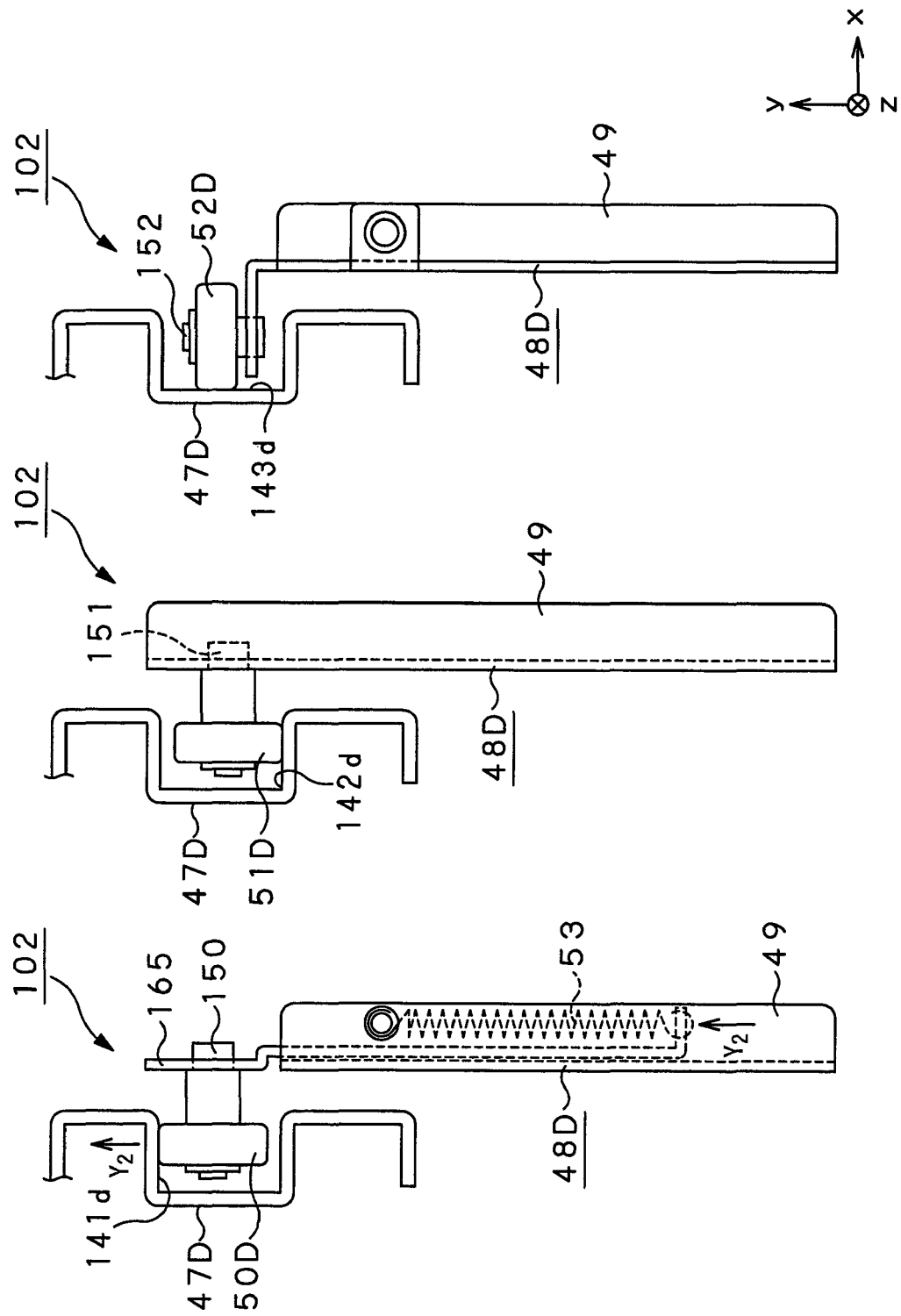
FIG. 21A is a side elevation of a first guide roller installed in place.
FIG. 21B is a side elevation of a second guide roller installed in place and FIG. 21C is a side elevation of a third guide roller installed in place.

The second roller 51D is so installed on a spindle 151 set on the free end portion of the support bracket 49 that it will roll on a second wall 142d of the fourth guide rail 47D as shown in FIG. 21B.

Further, the third roller 52D is so installed on a spindle 152 set on a support piece 49a formed by bending the free end portion of the support bracket 49 that it will roll on a third wall 143d of the fourth guide rail 47D as shown in FIG. 21C.

As above, in the up/down drive mechanism 8 in which the carrier 7 is supported on the support frame 6, the first rollers 50A and 50B of the first and second guide roller mechanisms 48A and 48B are laid in contact with the first walls 141a and 141b of the first and second guide rails 47A and 47B and the second rollers 51A and 51B are forced by the helical torsion springs 163 to be in contact with the second walls 142a and 142b opposite to the first walls 141a and 141b, as shown in FIGS. 8, 18 and 19. Further, the first rollers 50C and 50D of the third and fourth guide roller mechanisms 48C and 48D are forced by the helical torsion springs 163 to be in contact with the first walls 141c and 141d of the third and fourth guide rails 47C and 47D and the second rollers 51C and 51D are laid in contact with the second walls 142c and 142d opposite to the first walls 141c and 141d as shown in FIGS. 8, 20 and 21. Thus, the carrier 7 is limited in y-axial position, in angular position about the x-axis and in angular position about the z-axis which is also the axis of the feed screw 42, as shown in FIG. 8, in relation to the support frame 6.

Further, in the up/down drive mechanism 8, the third roller 52A of the first guide roller mechanism 48A is formed by the helical tension spring 53 in the direction of arrow X1 to be in contact with the third wall 143a of the first guide rail 47A as shown in FIGS. 8 and 18C, and the third roller 52C of the third guide roller mechanism 48C is forced by the helical torsion spring 163 in the direction of arrow X1, as in case the third roller 52A is forced, to be in contact with the third wall 143c of the third guide rail 47C as shown in FIG. 20C. The third roller 52B of the second guide roller mechanism 48B is laid in contact with the third wall 143b of the second guide rail 47B as shown in FIG. 19C, and the third roller 52D of the fourth guide roller mechanism 48D is laid in contact with the third wall 143d of the fourth guide rail 47D as shown in FIG. 21C. Because of the above supporting structure for the third rollers 52A, 52B, 52C and 52D of the first to fourth guide roller mechanisms 48A, 48B, 48C and 48D, the up/down drive mechanism 8 permits to limit the x-axial position of the carrier 7 in relation to the support frame 6 and also the y-axial position of the carrier 7 in relation to the support frame 6, as shown in FIG. 8.

Use of the up/down drive mechanism 8 in the embodiment of the present invention permits to limit the x- and y-axial positions of the carrier 7 as shown in FIG. 8 and also permits to limit the rotation of the carrier 7 about the x-, y- and z-axes in relation to the support frame 6.

The up/down drive mechanism 8 constructed as above can move the carrier 7 up and down stably in relation to the stationary support frame 6 because the first to fourth guide rails 47A to 47D and first to fourth guide roller mechanisms 48A to 48D permit to limit the x- and y-axial positions of the carrier 7 and rotation of the carrier 7 about the x-, y- and x-axes in relation to the support frame 6.

Figure 22:
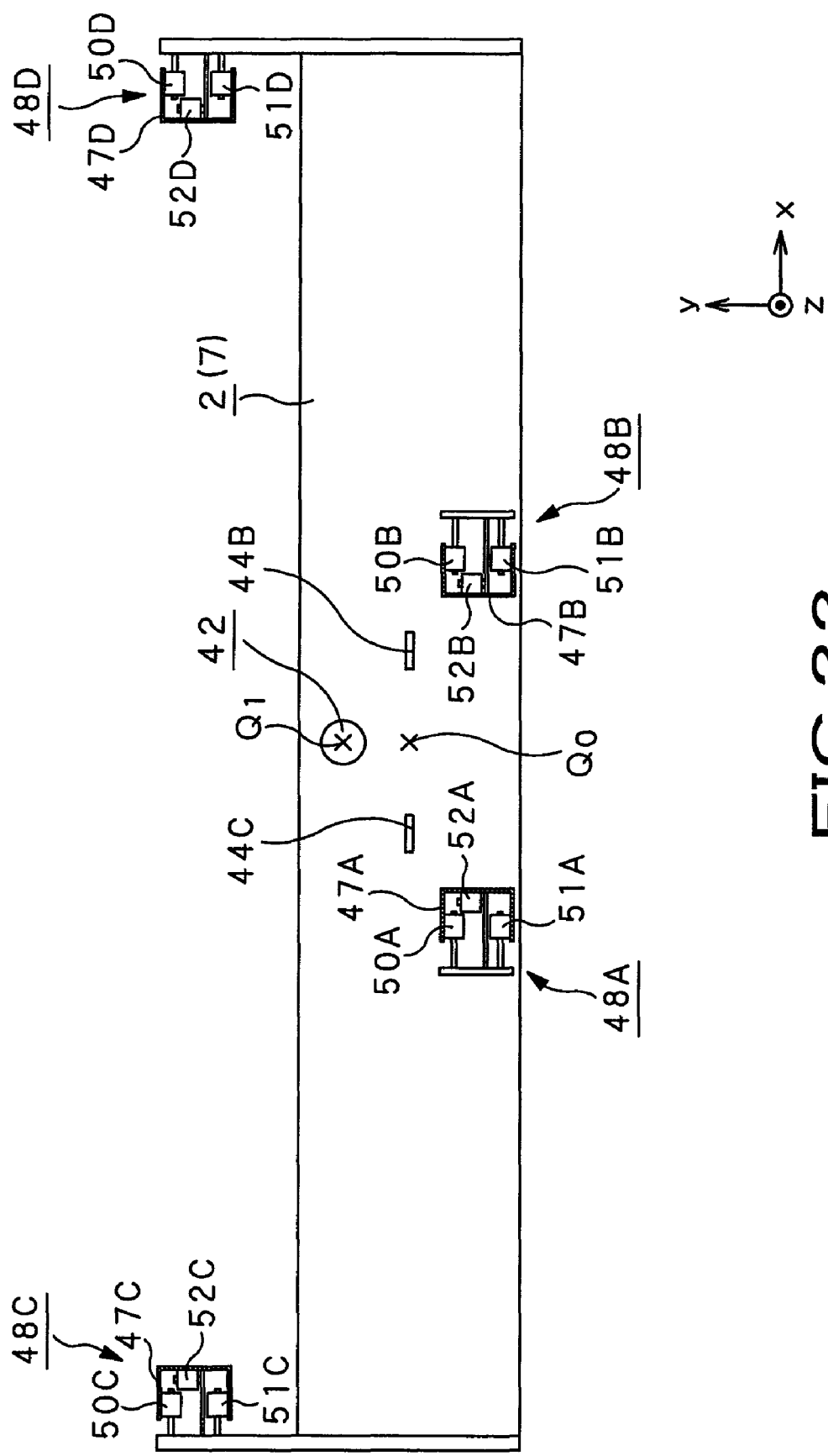
FIG. 22 is a plan view showing the relation between a point at which the carrier is supported on the pivot bearing mechanism and the center of gravity of the carrier.
Figure 23:
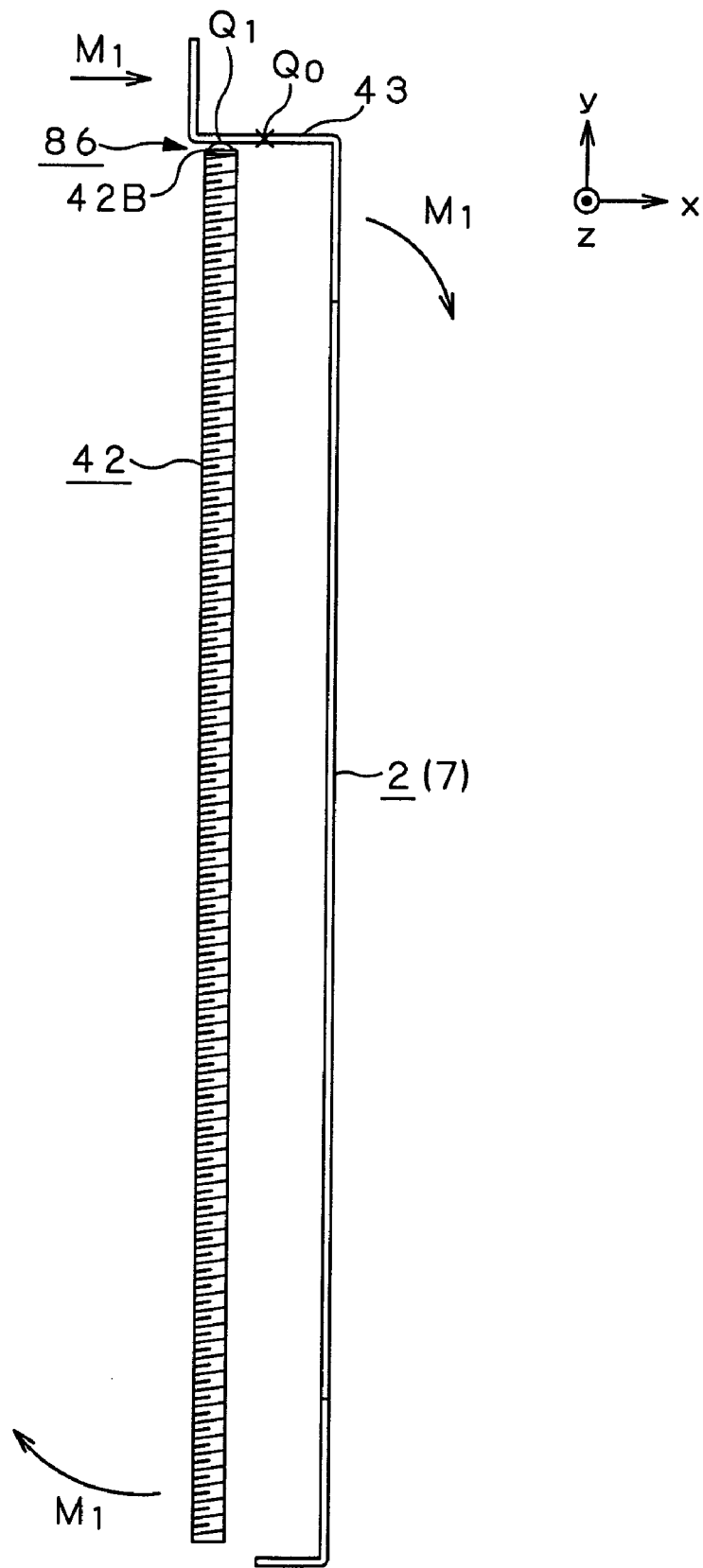
FIG. 23 is a side elevation showing a torque developed in the carrier at the supporting point where the carrier is supported on the pivot bearing mechanism.

In the audio/display apparatus 1 as the embodiment of the present invention, the carrier 7 is so supported on the pivot bearing mechanism 86 that a support point Q1 thereof is positioned at the side of the first rollers 50C and 50D included in the third and fourth guide roller mechanisms 48C and 48D, respectively, located behind the center of gravity Q0 of the carrier 7 supported on the pivot bearing mechanism 86 as shown in FIG. 22. Thus, in the audio unit 2 supported on the carrier 7, a torque in the direction of arrow M1 in FIG. 23 about the support point Q1 will be given to the pivot bearing mechanism 86 as shown in FIG. 23. As a result, weight will be applied to each of the first rollers 50A and 50B installed rotatably on the stationary spindles 150, respectively, located behind the first and second guide roller mechanisms 48A and 48B, respectively, and to each of the second rollers 51C and 51D installed rotatably on the spindles 151, respectively, located before the third and fourth guide roller mechanisms 48C and 48D, respectively. It is possible to control the weight applied to these second rollers 51A and 51B located before the first and second guide roller mechanisms 48A and 48B and forced by the forcing members and to the first rollers 50C and 50D located behind of the third and fourth guide roller mechanisms 48C and 48D.

Thus, it is possible to prevent the carrier 7 from being applied with weight larger than the force of the forcing means provided to force the second rollers 51A and 51B of the first and second guide roller mechanisms 48A and 48B and first rollers 50C and 50D of the third and fourth guide roller mechanisms 48C and 48D, wherein the carrier 7 can stably be moved up and down.

According to the embodiment of the present invention, with the carrier 7 being supported at a total of four points at opposite sides thereof on the support frame 6 via the first to fourth guide roller mechanisms 48A to 48D to be movable vertically, the single feed screw 42 provided in the carrier 7 is moved vertically to move the carrier 7 vertically. Thus, the carrier 7 has the x- and y-axial positions and rotation about the x-, y- and z-axes thereof limited. So, the feed screw 42 to move the carrier 7 vertically may not be provided in the center of the carrier 7 but may be provided in any position where the driving force can be transmitted from the drive mechanism 85 to the feed screw 42.

It should be noted that the construction of the up/down drive mechanism 8 according to this embodiment is not limited to the aforementioned one but may appropriately be modified without departing from the scope defined herein. That is, in case the audio unit 2 and display unit 3 are larger and heavier, the up/down drive mechanism 8 may include additional guide rails and guide roller mechanisms which are not necessarily required. Also, in case the drive motor 34 is laid horizontally or in case the drive motor 34 and driven nut 40 are disposed near to each other, the rotation of the drive motor 34 may be transmitted to the driven nut 40 via gears, for example.

Next, the present invention will be illustrated and explained concerning the second embodiment thereof. As shown in FIGS. 24 to 27, an audio/display apparatus 1 as the second embodiment uses an up/down drive mechanism 87 to move a carrier 7 vertically by first and second driven screws 55 and 56 rotated by a drive motor 34. The up/down drive mechanism 87 includes the first and second driven screws 55 and 56, driven pulleys 57A and 57B fixed to the drive screws 55 and 56, respectively, driven nuts 58A and 58B fixed to the carrier 7 and through which the first and second driven screws 55 and 56 are penetrated, respectively, etc.

Figure 24:
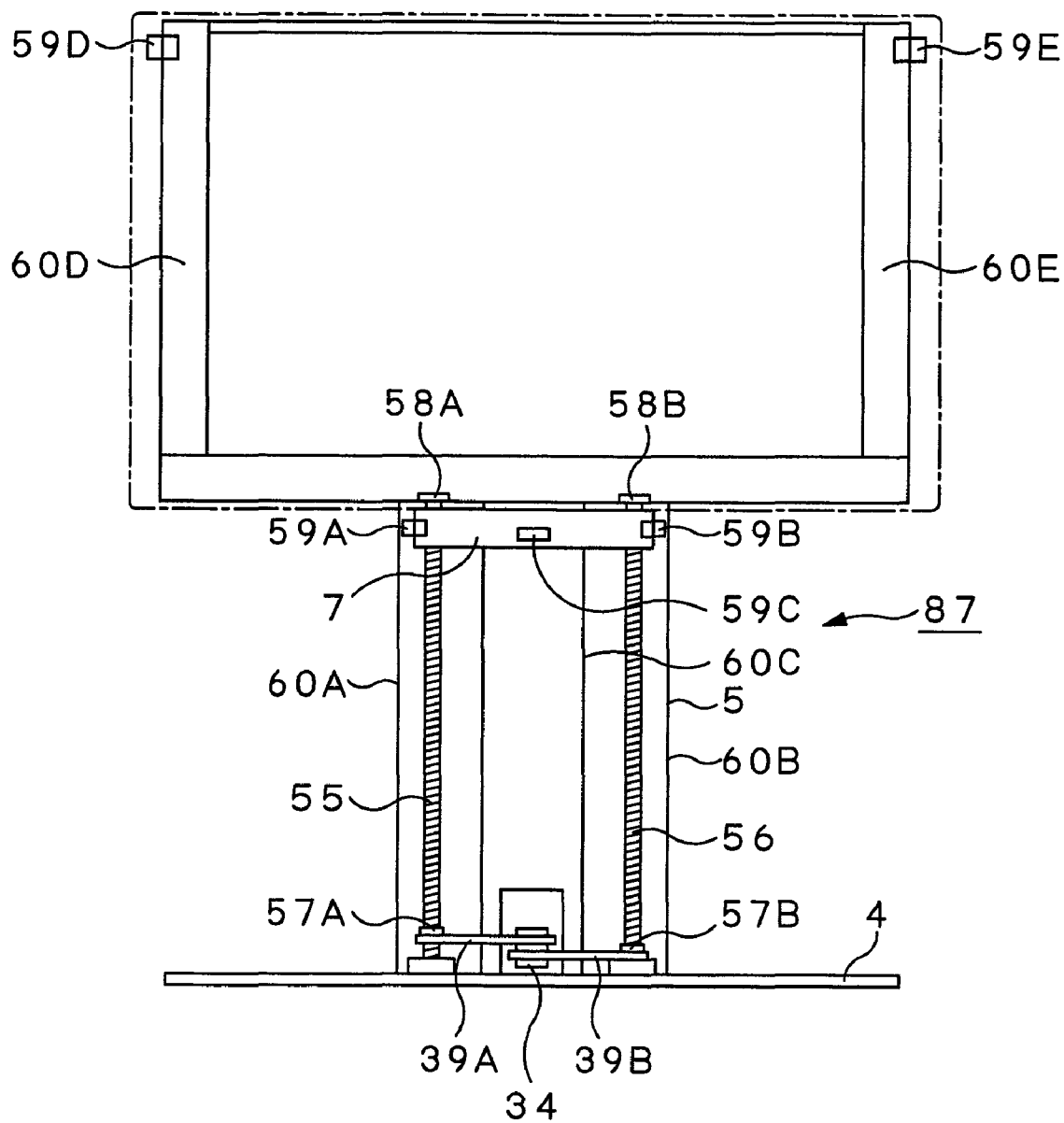
FIG. 24 is a fragmentary front view of the audio/display apparatus according to another embodiment of the present invention.

The above first and second driven screws 55 and 56 are also elongated members having a length corresponding to the moving distance of the carrier 7 and externally threaded over the length thereof. As shown in FIG. 24, the first driven screw 55 is provided upright inside a stand 5 with either end thereof being supported rotatably in a pair of bearings axially aligned with upper and lower cross-beam members (not shown) of a support frame 6. Inside the stand 5, the second driven screw 56 is also supported upright in a similar supporting mechanism to that for the first driven screw 55 to extend in parallel to the latter.

The first and second driven screws 55 and 56 have driven pulleys 57A and 57B fixed near the lower ends thereof, respectively. The rotation of the drive motor 34 is transmitted to the first and second driven screws 55 and 56 via transmission belts 39A and 39B wound on the driven pulleys 57A and 57B and a drive pulley 38 of the drive motor 34, respectively, and thus the first and second driven screws 55 and 56 are rotated at the same speed.

Figure 27:
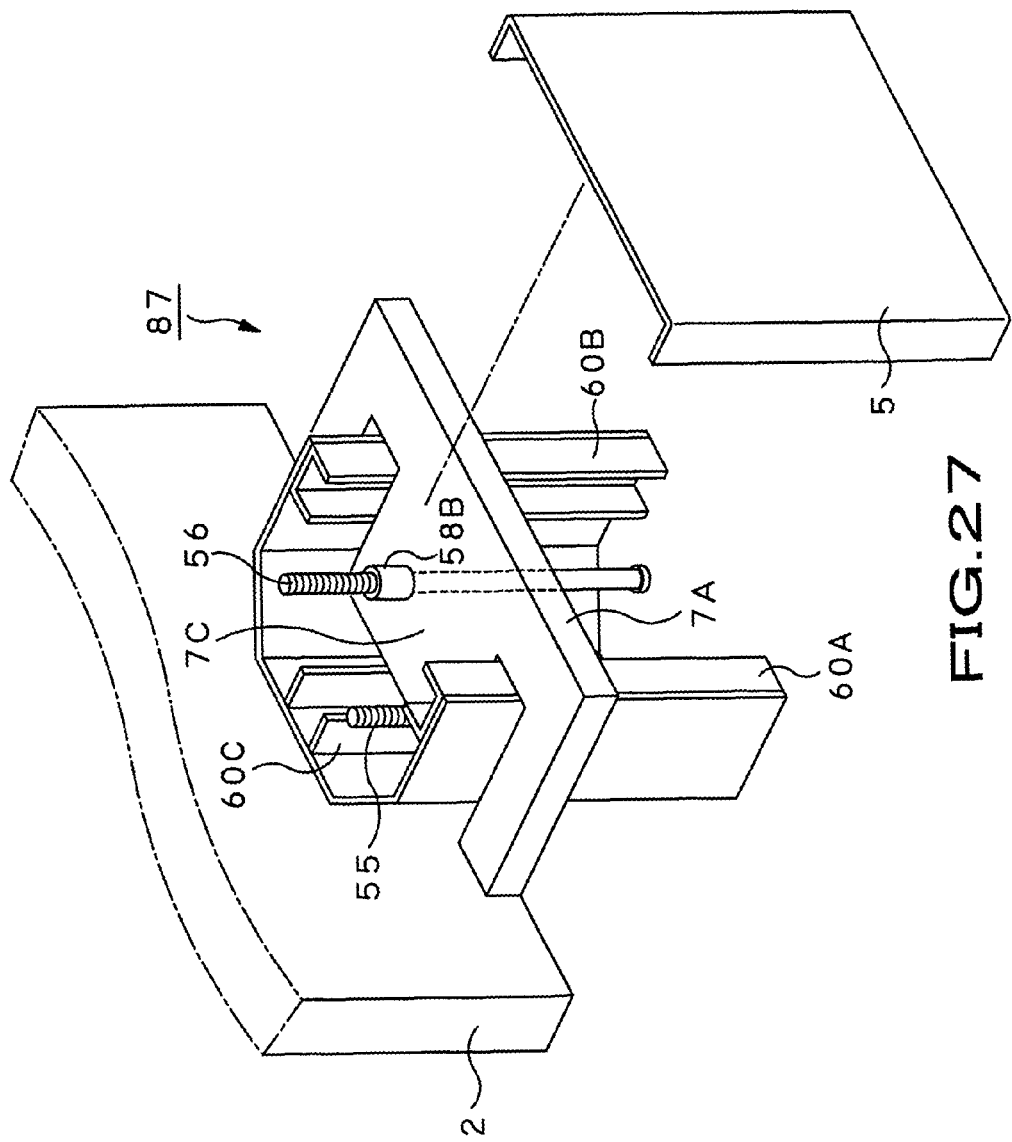
FIG. 27 is a fragmentary exploded perspective view of the up/down drive mechanism.

As shown in FIG. 27, the first and second driven screws 55 and 56 are penetrated through an upper cross-beam member 7C of the carrier 7 and driven nuts 58A and 58B are screwed on the first and second driven screws 55 and 56, respectively, at the top of the upper cross-beam member 7C. The driven nuts 58A and 58B are cylindrical members, and fitted in through-holes, respectively, formed in an upper cross-beam member 7A. The driven nuts 58A and 58B have flange portions formed at the lower-end portions thereof and which are to be fixed to the upper cross-beam member 7C. The through-holes in the driven nuts 58A and 58B are nearly equal in diameter to the outside diameter of the first and second drive screws 55 and 56, and have inner walls threaded over the length thereof (not shown).

The driven nuts 58A and 58B are fixed to the upper cross-beam member 7C against rotation relative to the latter and for disengagement from the latter. The first and second drive screws 55 and 56 are penetrated through the driven nuts 58A and 58B, respectively, with the external threads thereof being in mesh with the internal threads of the driven nuts 58A and 58B, respectively. As the first and second drive screws 55 and 56 are rotated about their axes, the driven nuts 58A and 58B are moved axially thereof owing to the engagement between the internal threads thereof and external threads of the drive screws 55 and 56 to move the carrier 7 vertically by means of the upper cross-beam member 7C.

It should be noted that the audio unit 2 having been moved from the first position to the second position is inclined in relation to the display unit 3 as the case may be. This will take place if the precision of assembling the carrier 7 to the support frame 6 or precision of installing the audio unit 2 or display unit 3 is not satisfactory. On this account, by assembling the audio unit 2 so that the engagement of the driven nuts 58A and 58B with the first and second drive screws 55 and 56, respectively, can be adjusted, it is possible to adjust the posture of the audio unit 2. Namely, such an inclination of the audio unit 2 is corrected by adjusting the horizontal position of the driven nuts 58A and 58B in relation to the first and second drive screws 55 and 56, respectively.

The up/down drive mechanism 87 in the second embodiment also includes a travel guide mechanism composed of a plurality of guide roller mechanisms and a plurality of guide rails intended to assure a stable up/down movement of the carrier 7 in relation to the support frame 6. More specifically, the travel guide mechanisms include first to fifth guide roller mechanisms 59A to 59E and first to fifth guide rails 60A to 60E.

Figure 25:
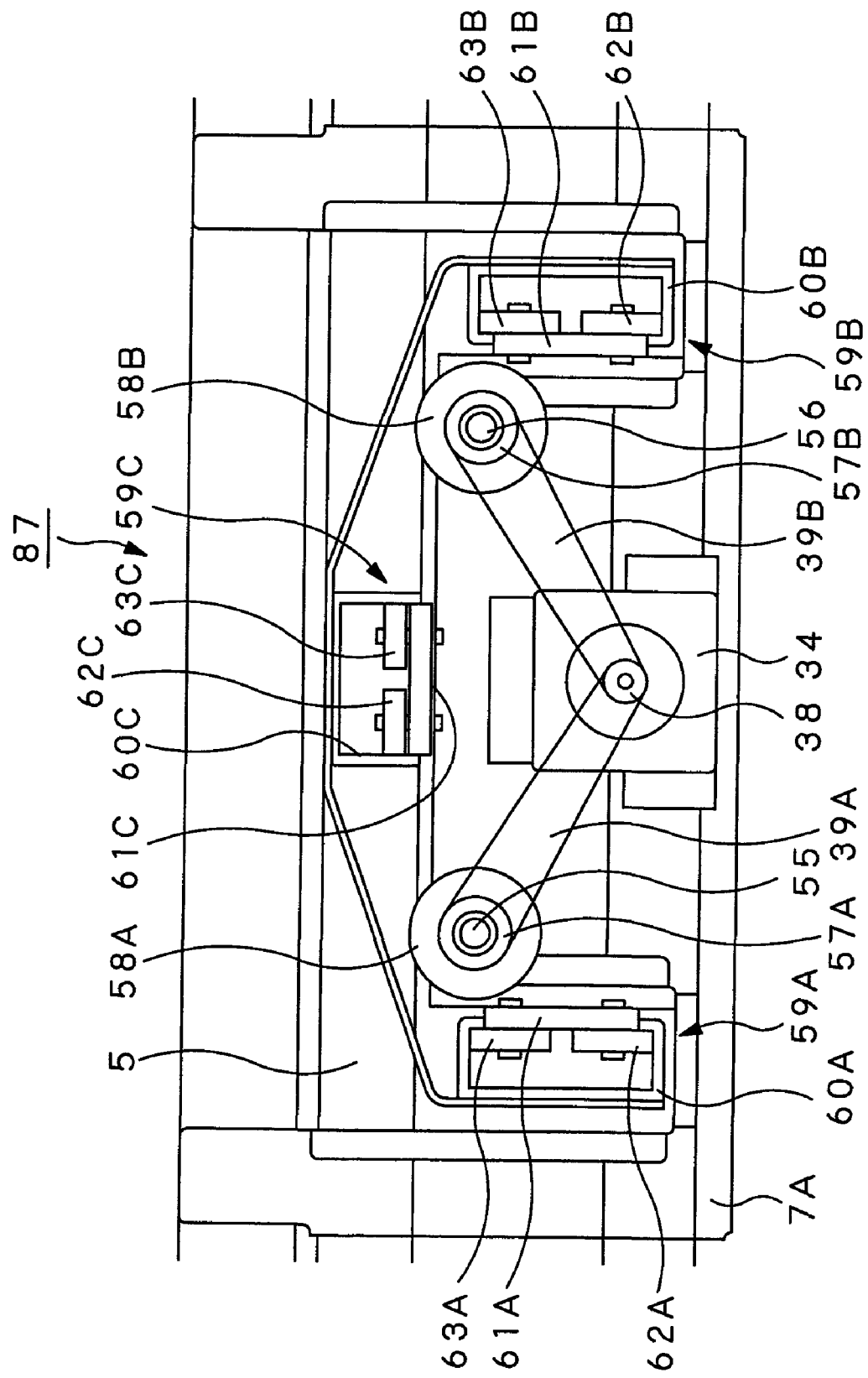
FIG. 25 is a fragmentary plan view of the up/down drive mechanism.
Figure 26:
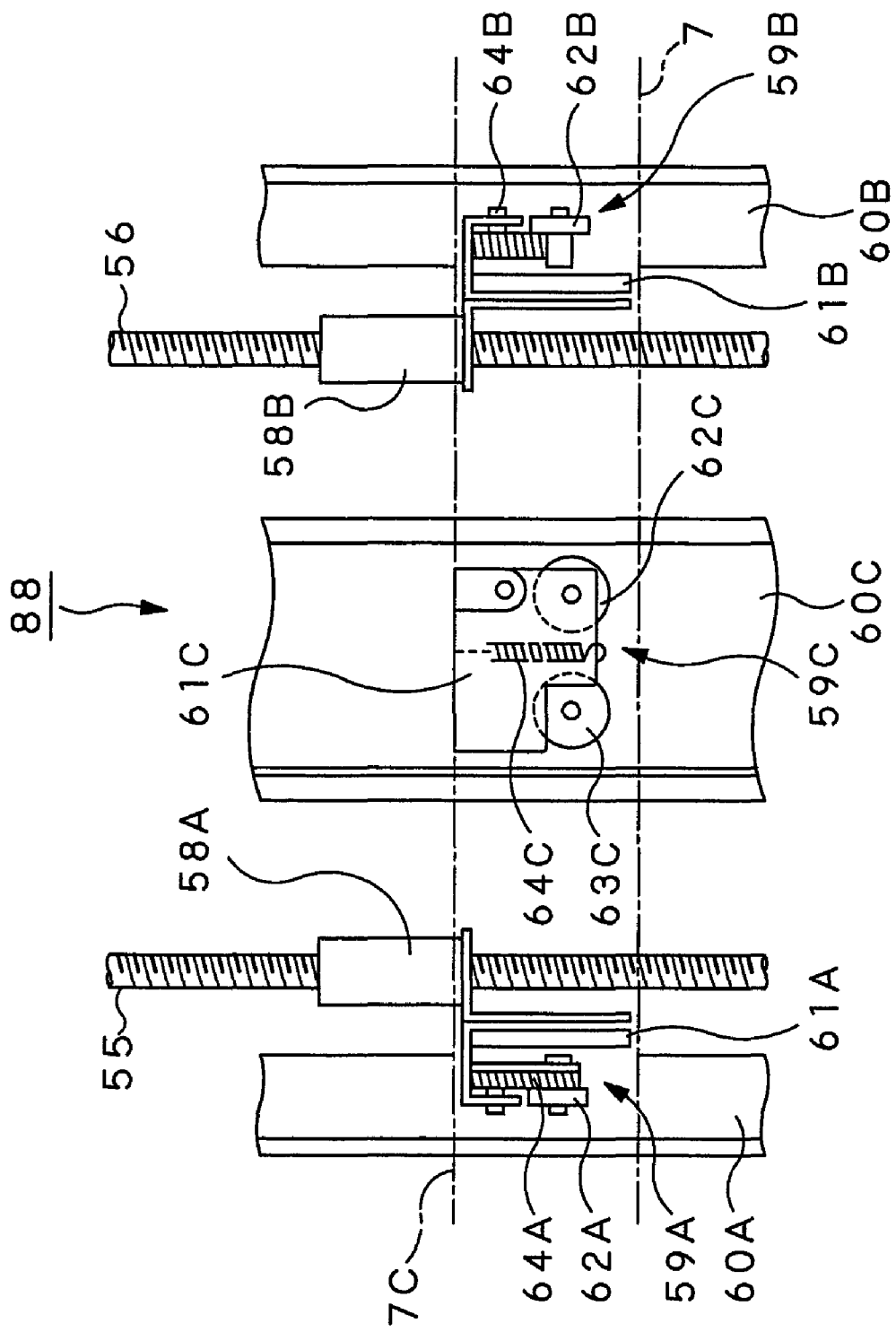
FIG. 26 is a fragmentary front view of the guide roller mechanism.

Each of the guide rails 60 is formed from a channel-shaped elongated material, and installed in place upright to the support frame 6. As shown in FIGS. 25 to 27, each of the first to third guide rails 60A to 60C is installed upright on the support frame 6 to surround the upper cross-beam member 7C of the carrier 7. The fourth and fifth guide rails 60D and 60E are installed upright on the support frame 6 oppositely to the opposite lateral sides, respectively, of the display unit 3.

The guide roller mechanisms 59A to 59E are equal in structure to each other, and include first to fifth brackets 61A to 61E, first guide rollers 62A to 62E, second guide rollers 63A to 63E and helical springs 64A to 64E, respectively, as shown in FIG. 26. The guide roller mechanisms 59 have the brackets 61 thereof fixed to the carrier 7, and the first and second guide rollers 62 and 63 are installed to the brackets 61 to rotate in a direction away from each other under the resilience of the helical springs 64. The guide roller mechanisms 59 are installed to the guide rails 60 with the first and second guide rollers 62 and 63 being positioned in the inner space.

In the drive mechanism 87 constructed as above, the rotation of the drive motor 34 put in operation is transmitted from an output shaft 37 of the drive motor 34 to the drive pulley 38, transmission belts 39A and 39B, driven pulleys 57A and 57B, and then to the first and second drive screws 55 and 56 which will thus be rotated. In the drive mechanism 87, the rotation of the first and second drive screws 55 and 56 is transmitted, via the internal and external threads engaged with each other, to the driven nuts 58A and 58B which will thus be moved axially along the drive screws 55 and 56. Therefore, the drive mechanism 87 moves the carrier 7, to which the driven nuts 58A and 58B are fixed, vertically along the support frame 6 by means of the drive screws 55 and 56.

Also in the up/down drive mechanism 87 according to this embodiment, the combination of the guide roller mechanisms 59 and guide rails 60 limits the x- and y-axial positions of the carrier 7 in relation to the support frame 6 and also the rotation of the carrier 7 about the x- and z-axes in relation to the support frame 6. Such a limiting mechanism makes it possible to move the carrier 7 up and down stably in relation to the support frame 6 and makes it unnecessary to adjust each of the guide roller mechanisms 59. Use of the same parts in all the mechanisms will lead to streamlining of the assembling and adjusting steps and reduction of the manufacturing costs.

In the audio/display apparatuses 1 as the embodiments of the present invention, the aforementioned up/down drive mechanism 8 (87) and travel guide mechanisms move the carrier 7 supporting the audio unit 2 thereon vertically in relation to the support frame 6 having the display unit 3 mounted thereon. The carrier 7 having the large, heavy audio unit 2 mounted thereon can be moved up and down in relation to the support frame 6 by the drive motor 34 whose output torque is large.

In this audio/display apparatus 1, since the audio unit 2 is moved vertically along the front of the display unit 3, there will be defined a clearance between the audio and display units 2 and 3 along the entire length of the latter. Magazines, recording medium casings or other things will be placed near the stand 5 of the audio/display apparatus 1 as in the case of the ordinary television receiver.

In the audio/display apparatus 1, a foreign matter 71 such as a thing fallen from on the audio unit 2 or display unit 3 may possibly fall into a clearance defined between the audio and display units 3 when the audio unit 2 is moved up or down. In the audio/display apparatus 1, if the audio unit 2 is moved up or down while a foreign matter 71 somewhat larger than the clearance is staying between the audio and display units 2 and 3, the foreign matter 71 will be caught between the audio and display units 2 and 3 and possibly scratch or damage the display screen surface of a liquid crystal display 22 used in the display unit 3.

Also in the audio/display apparatus 1, if there is placed in a projected area of the audio unit 2 (area opposite to the lower surface of the audio unit 2) a foreign matter 71 larger than the lower surface of the audio unit 2 having been moved to the first position and than the height of the base 4, the foreign matter 71 will be caught between the audio unit 2 and base 4. When the audio/display apparatus 1 is in this condition, the drive motor 34 will be applied with a large load, and the feed screw 42, bearing 41 and the like will possibly be broken and displaced.

Figure 28:
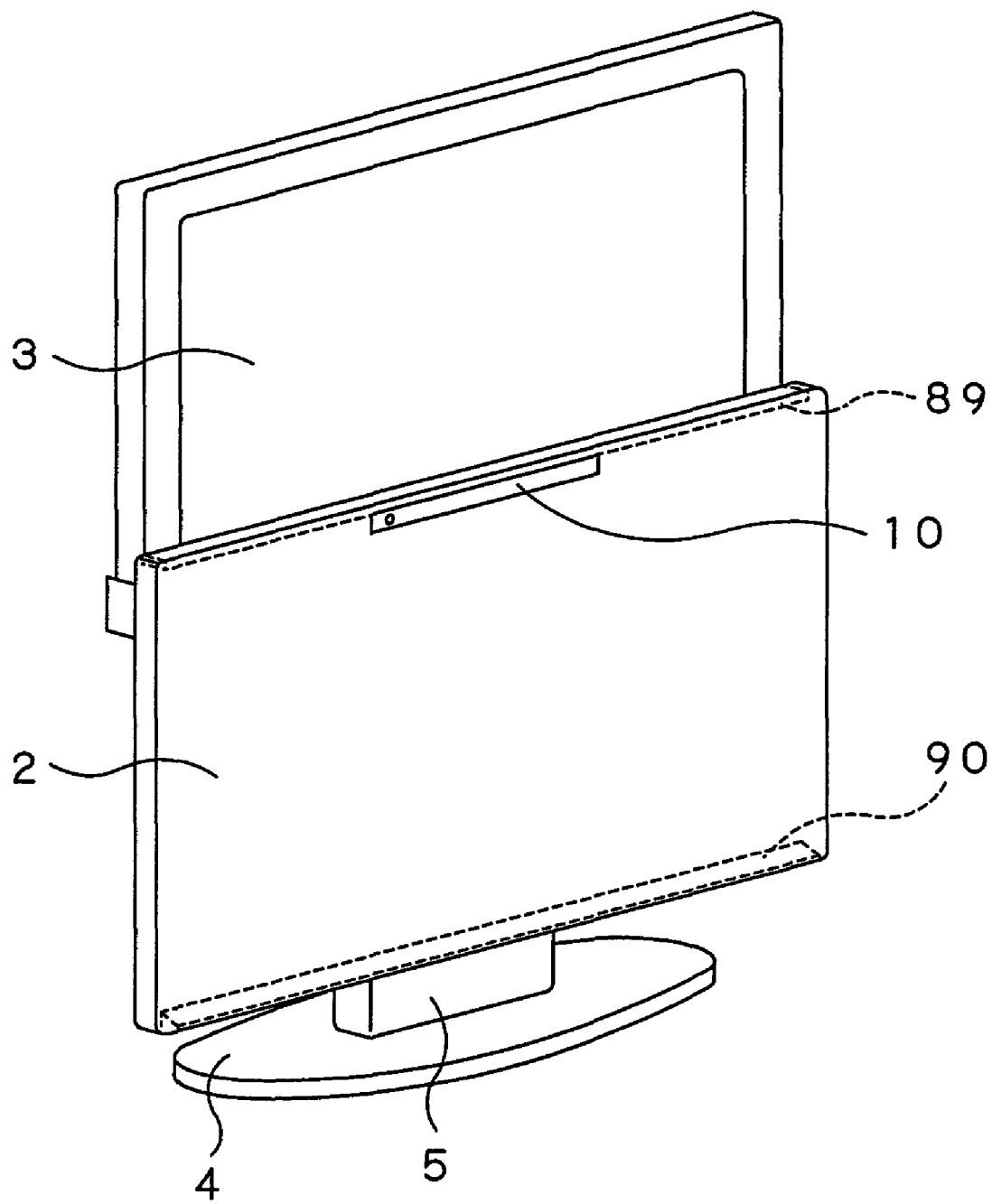
FIG. 28 illustrates foreign matter detecting mechanisms provided on the audio unit.

To detect such a foreign matter 71 and stop the carrier 7 from moving up or down, the audio/display apparatus 1 is provided at the top of the audio unit 2 with an upper foreign matter detecting mechanism 89 included in the upper stop sensor 29 as shown in FIG. 28. Also, in the audio/display apparatus 1, there is provided a lower foreign matter detecting mechanism 90 included in the lower stop sensor 30 on the bottom of the audio unit 2. In the audio/display apparatus 1, the upper and lower foreign matter detecting mechanisms 89 and 90 can detect a foreign matter 71 everywhere on a large audio unit 2 as will be described in detail later. Thus, the audio/display apparatus 1 is highly safe and reliable.

In the upper foreign matter detecting mechanism 89, a fixing concavity 65 provided on a top rear portion of the audio unit 2, opposite to the display unit 3, and formed over the length thereof, and it is combined with upper ornamental/structural components, as shown in FIG. 29. The upper foreign matter detecting mechanism 89 further includes an actuating plate 66, pressure-sensitive sheet 67, helical spring 69, etc. In the fixing concavity 65, there is formed a slit 65A extending along the plane one step lower than the audio-unit upper surface and in parallel to the edge line of the audio-unit upper surface and over the entire length of the fixing concavity 65. In the fixing concavity 65, a plurality of guide holes (not shown) is formed in line at predetermined intervals.

The actuating plate 66 includes a main surface portion 66A and detection wall portion 66B formed integrally with each other and from a synthetic resin in the same color as that of the housing of the audio unit 2, for example. Of the actuating plate 66, the main surface portion 66A is formed similar in shape to, and a little thinner than, the fixing concavity 65, and the detection wall portion 66B is formed by bending an end portion of the main surface portion 66A at right angles. The detection wall portion 66B is opposite to the front of the display unit 3. The actuating plate 66 is an elongated member having a generally L-shaped section defined by the sections of the horizontal main surface portion 66A and detection wall portion 66B perpendicular to the former. Of the actuating plate 66, the main surface portion 66A and detection wall portion 66B are formed a little thin and elongated to be partially deformable elastically.

The actuating plate 66 has formed integrally on the inner surface of the main surface portion 66A a switch actuator 66C formed from a plurality of convexities disposed in line oppositely to the detection wall portion 66B. The actuating plate 66 also has formed integrally on the inner surface of the main surface portion 66A a plurality of fulcrum studs 68 disposed in line. The fulcrum studs 68 are formed correspondingly to guide holes formed in the aforementioned fixing concavity 65 and have formed therein bottomed holes (not shown) open to the free end. When the actuating plate 66 is combined with the fixing concavity 65, the fulcrum studs 68 are penetrated through the corresponding guide holes.

As well known, the pressure-sensitive sheet 67 is formed from a pair of electrodes covered with an elastic sheet with the insulation of the electrodes being maintained. When the elastic sheet is pressed, the electrodes are short-circuited between them to provide switching. The pressure-sensitive sheet 67 can detect a state change in a wide range and be freely deformed for use. As shown in FIG. 29, the pressure-sensitive sheet 67 is led from inside the audio unit 2 to the fixing concavity 65 through the slit 65A, and joined to the entire area of the fixing concavity 65.

Of the upper foreign matter detection mechanism 89, the actuating plate 66 is combined with the fixing concavity 65 to hold the pressure-sensitive sheet 67 between them. A helical spring 69 is fitted on each of the fulcrum studs 68 inserted in the guide holes in the actuating plate 66, and a set screw 70 is screwed in the bottomed hole to compress the helical spring 69 by a flange portion 70A thereof. The helical spring 69 is compressed between the flange portion 70A of the set screw 70 and the inner surface of the fixing concavity 65 to accumulate the resilience which will be used to elevate the actuating plate 66 to above the fixing concavity 65 and hold it there. The actuating plate 66 will not emit any sound of vibration and held stably along its entirety while the audio unit 2 is being moved vertically because the resilience of the helical spring 69 acts on the actuating plate 66.

Figure 29A:
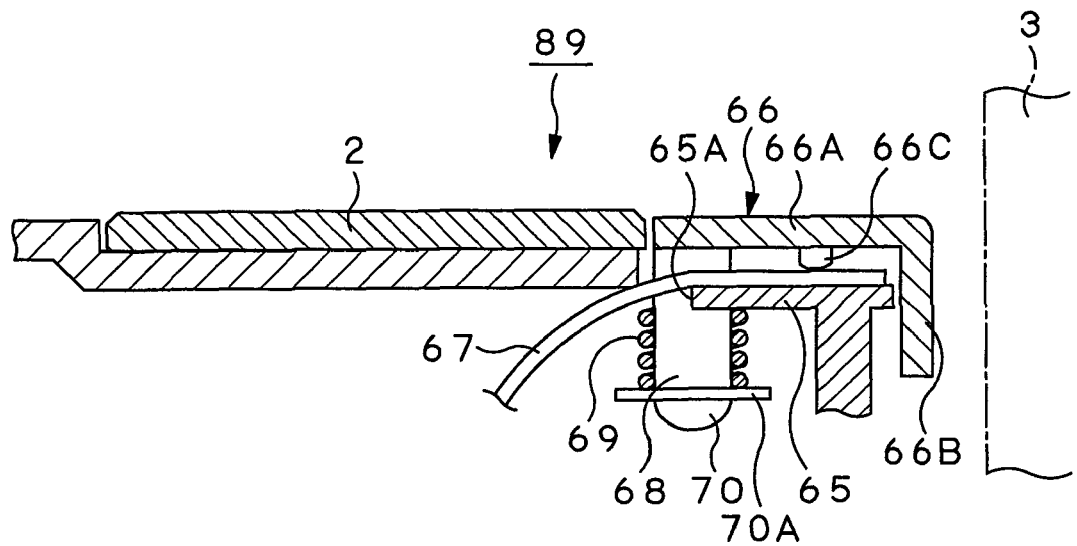
FIG. 29A shows the mechanism when in the normal state and FIG. 29B shows the mechanism when it has detected a foreign matter.

Of the upper foreign matter detecting mechanism 89, the main surface portion 66A of the actuating plate 66 is nearly flush with the upper surface of the audio unit 2 and the detection wall portion 66B is opposite to the front of the display unit 3, as shown in FIG. 29A. In this condition, the switch actuator 66C of the actuating plate 66 of the upper foreign matter detecting mechanism 89 is in loose contact with the pressure-sensitive sheet 67 and holds the latter in the off state.

In case a foreign matter 71 dropped on the upper surface of the audio unit 2 is lodged in a clearance defined between the detecting wall portion 66B of the actuating plate 66 and the display unit 3, the upper foreign matter detecting mechanism 89 quickly detects the foreign matter 71 thus lodged and outputs a detection signal to the microcomputer 26. If the audio unit 2 is moved up or down with the foreign matter 71 being lodged between the actuating plate 66 and display unit 3, the detection wall portion 66B of the upper foreign matter detecting mechanism 89 is applied, via the foreign matter 71, with a force that takes the detection wall portion 66B into the clearance.

Figure 29B:
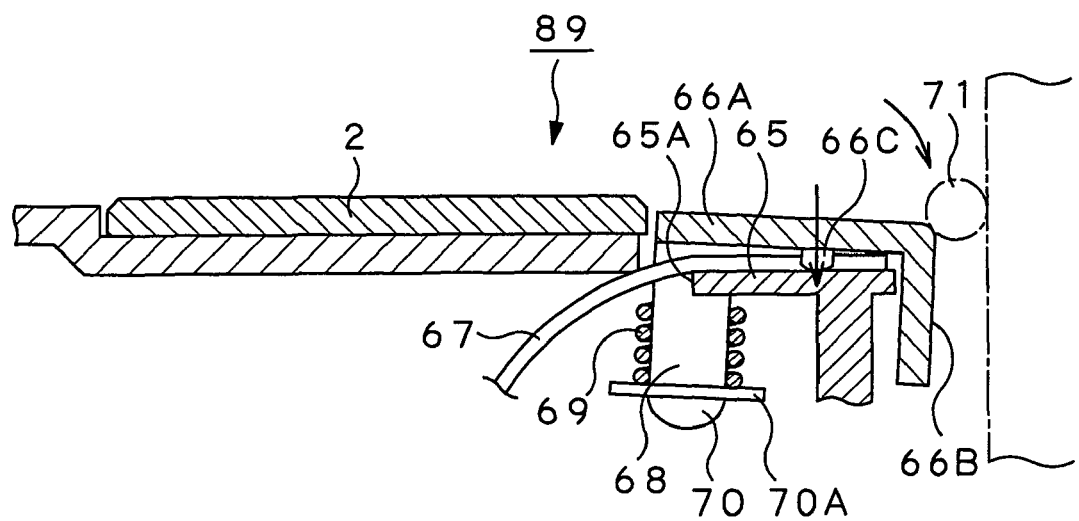

In the upper foreign matter detecting mechanism 89, the force applied to the detection wall portion 66B acts as a force to pivot the actuating plate 66 about the switch actuator 66C in the clockwise direction as shown in FIG. 29B. In the upper foreign matter detecting mechanism 89, the actuating plate 66 is moved against the resilience of the helical spring 69 in a direction in which the fulcrum studs 68 opposite to the detection wall portion 66B will come out of the guide holes. In the upper foreign matter detecting mechanism 89, the switch actuator 66C as a pivoting fulcrum for the actuating plate 66 will thus be applied with a downward force to press the pressure-sensitive sheet 67 in the direction of arrow in FIG. 29B. The pressure-sensitive sheet 67 is thus turned on to output a detection signal.

In the upper foreign matter detecting mechanism 89, when the foreign matter 71 is removed out of the clearance, the actuating plate 66 is returned to the initial position under the action of the helical spring 69. It should be noted that since in the upper foreign matter detecting mechanism 89, the actuating plate 66 is partially deformed elastically as above, it pivots at a place where the foreign matter 71 is lodged as above and thus the foreign matter 71 can be detected with a high sensitivity everywhere along the whole length of the actuating plate 66. The upper foreign matter detecting mechanism 89 can detect a foreign matter 71 everywhere along the entire upper surface of the audio unit 2, but the actuating plate 66 will not give any feeling of strangeness because its support structure is provided not to be visible from outside.

Figure 30:
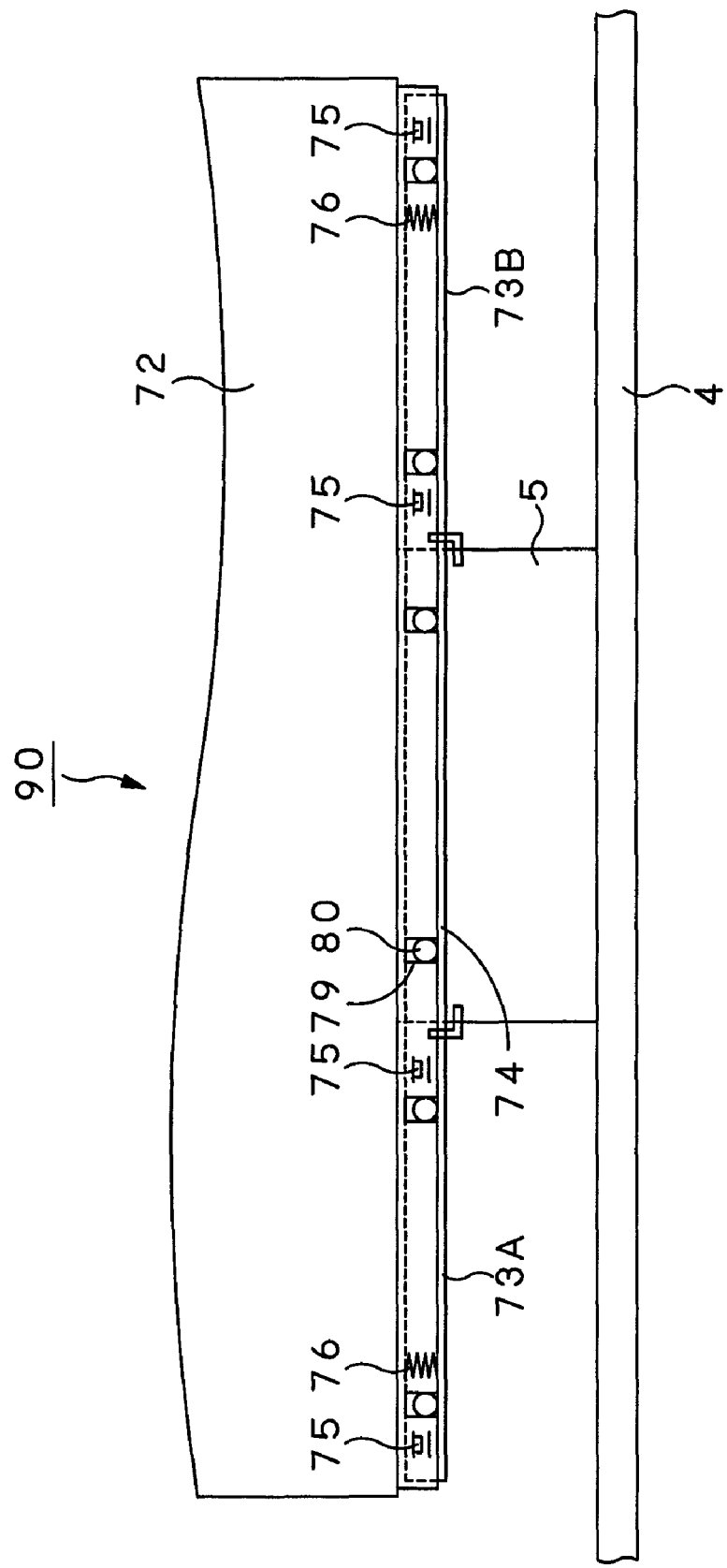
FIG. 30 is a fragmentary front view of the lower foreign matter detecting mechanism.

The lower foreign matter detecting mechanism 90 is deigned to detect a foreign matter 71 positively everywhere on the entire lower surface of the audio unit 2. Namely, the lower foreign matter detecting mechanism 90 is constructed to make detection of a foreign matter 71 so that a portion of the lower surface, corresponding to the stand 5 at the center as shown in FIG. 30, will not be any dead space. The lower foreign matter detecting mechanism 90 includes three blocks, namely, a central block corresponding to the stand 5, and lateral side blocks across the central block. The lower foreign matter detecting mechanism 90 is constructed for the central and lateral side blocks to interlock with each other, whereby the structure and adjustment of the mechanism 90 can be simplified and detection can be made without any dead space over the entire area of the mechanism 90.

As shown, the lower foreign matter detecting mechanism 90 includes a bracket member 72 fixed to the lower surface of the housing of the audio unit 2, a pair of right and left actuating members 73A and 73B combined with the bracket member 72 and a coupling actuating plate 74 provided at the center to couple the actuating members 73A and 73B with each other. The lower foreign matter detecting mechanism 90 further includes a pair of detection switches 75A and 75B provided for each actuating member 73 and a pair of helical springs 76A and 76B.

In the lower foreign matter detecting mechanism 90, the entire bracket member 72 except for the portion thereof corresponding to the stand 5 is formed as a box nearly the same in shape as the bottom of the audio unit 2 and open at the bottom thereof. The central portion of the bracket member 72, corresponding to the stand 5, has the rear side thereof concaved to avoid abutment with the stand 5, which however will not be explained in detail. The bracket member 72 has formed inside the central portion thereof a narrow slit-shaped space communicating with a wide space on either side of the central portion.

Figure 31:
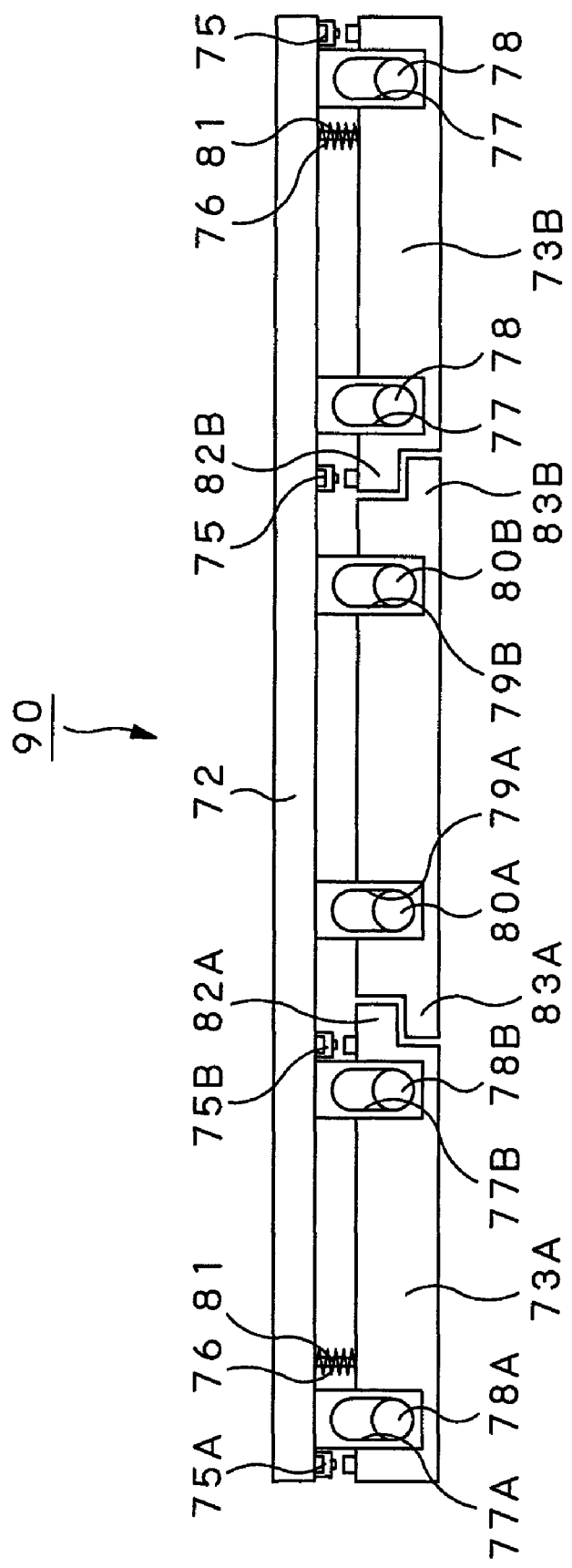
FIG. 31 explains the construction of the lower foreign matter detecting mechanism.

The bracket member 72 has the pair of detection switches 75 installed on the bottom of the wide lateral spaces thereof across the central portion to be opposite to positions near the longitudinal ends of each actuating member 73 which will be described in detail later. The bracket member 72 has formed in either lateral wall thereof opposite to the width a plurality of guide holes 77 that are vertical elongated holes. As shown in FIG. 31, the guide holes 77 include a pair of guide holes 77A and 77B formed in longitudinally separate positions in lateral walls of the wide lateral spaces to accommodate the actuating members 73, and a pair of guide holes 79A and 79B formed in longitudinally separate positions in the lateral walls across the narrow central space to accommodate the coupling actuating plate 74.

In the lower foreign matter detecting mechanism 90, the actuating members 73 are installed in the wide lateral spaces of the bracket member 72 to be freely movable up and down with the bottom thereof being projected. The actuating members 73 are formed from a box-shaped member nearly equal in size to the bottom of a portion of the audio unit 2, projected laterally from the stand 5, and open at the top thereof. The actuating member 73 has formed integrally in positions near the longitudinal opposite ends thereof switch actuators located opposite to the aforementioned detection switches 75 at the bracket member 72. The actuating member 73 has formed on either lateral wall thereof guide pins 78A and 78B which are to be engaged in the aforementioned guide holes 77A and 77B, respectively, in the bracket member 72.

The actuating member 73 has formed integrally nearly at the center of the width, nearer to one end of the bottom, a stud pin 81 on which a helical spring 69 is secured. Further, the actuating member 73 is stepped at the one longitudinal end thereof opposite to the stud pin 81, the step forming a coupling convexity 82. It should be noted that the actuating members 73A and 73B are horizontally symmetrical with each other, the stud pins 81 are located outside the actuating members 73A and 73B and the coupling convexities 82 are formed at the lateral sides, respectively, opposite to each other, as shown in FIG. 31.

In the lower foreign matter detecting mechanism 90, the coupling actuating plate 74 is formed from a rectangular sheet-like member having a height and thickness allowing itself to be accommodated in upright position in the slit formed in the narrow central space of the bracket member 72 and a length generally equal to the space between the aforementioned actuating members 73A and 73B. The coupling actuating plate 74 has formed in both lateral walls thereof guide pins 80A and 80B, respectively, which are to be engaged in the aforementioned guide holes 79A and 79B, respectively, in the bracket member 72. Also, the coupling actuating plate 74 has formed integrally at the longitudinal end portions thereof coupling convexities 83A and 83B, respectively, which can be engaged on the aforementioned coupling convexities 82, respectively, at the actuating member 73.

In the lower foreign matter detecting mechanism 90, the bracket member 72 is fixed to the bottom of the housing of the audio unit 2, and the actuating members 73 and coupling actuating plates 74 are combined with each other in the inner space of the bracket member 72. In the lower foreign matter detecting mechanism 90, the actuating members 73 are installed to the bracket member 72 with the guide pins 78A and 78B being engaged in the guide holes 77A and 77B, respectively, and the coupling actuating plate 74 is installed to the bracket member 72 with the guide pins 80A and 80B being engaged in the guide holes 79A and 79B, respectively. Also, in the lower foreign matter detecting mechanism 90, the guide pins 78 and 80 are movable in the direction of height in the guide holes 77 and 79, respectively, and the actuating members 73 and coupling actuating plate 74 operate in the moving range of the guide pins to detect a foreign matter 71.

In the lower foreign matter detecting mechanism 90, the actuating members 73 are combined with the bracket member 72 with the helical springs 76 fitted on the stud pins 81 being compressed. Also, in the lower foreign matter detecting mechanism 90, the actuating members 73 will be pushed downward under the resilience of the helical springs 76 and have their bottoms projected from the bracket member 72. In the lower foreign matter detecting mechanism 90, the coupling actuating plate 74 has the coupling convexity 83 thereof engaged on the coupling convexity 82 of the actuating member 73, so that the resilience of the helical spring 76 will act on the coupling actuating plate 74 via the actuating member 73 and thus the coupling actuating plate 74 be pushed down to have the bottom thereof projected from the bracket member 72. In the lower foreign matter detecting mechanism 90, the actuating members 73 being pushed down inside the bracket member 72, each of the detection switches 75 are kept in the off state.

Even when a foreign matter 71 is lodged in any position on the lower surface of the audio unit 2, the lower foreign matter detecting mechanism 90 will detect how the foreign matter 71 is lodged and output a detection signal to the microcomputer 26 which in turn will quickly stop the audio unit 2 from moving downward. The lower foreign matter detecting mechanism 90 is so designed that if a foreign matter 71 is lodged in any longitudinal position between each of the actuating members 73 and coupling actuating plate 74, the latter will make a so-called seesaw movement to detect the foreign matter 71. In the lower foreign matter detecting mechanism 90, each of the actuating members 73 and coupling actuating plates 74 is constructed to have no fixed fulcrum, which permits to detect a foreign matter 71 in a wide area without any dead zone.

In the lower foreign matter detecting mechanism 90, when the audio unit 2 is moved down with a foreign matter 71 being in a position near the periphery of the audio unit 2 as shown in FIG. 32A, the actuating members 73A will be pivoted clockwise against the resilience of the helical spring 76. The actuating member 73A will be pivoted about the inner guide pin 78B to turn on the outer detection switch 75A with the outer guide pin 78A being moved upward inside the guide hole 77A. In the lower foreign matter detecting mechanism 90, since only the actuating member 73A will be pivoted as above, while the other actuating member 73B and coupling actuating plate 74 will not operate. So, the weight to the switching operation is reduced and detection can be made with a high sensitivity.

In the lower foreign matter detecting mechanism 90, in case the audio unit 2 is moved down with a foreign matter 71 being lodged nearly inside of the audio unit 2 as shown in FIG. 32B, the actuating member 73A will be pivoted counterclockwise against the resilience of the helical spring 76 as indicated with an arrow in FIG. 32B. At this time, the actuating member 73A will be pivoted about the outer guide pin 78A to turn on the inner detection switch 75B with the inner guide pin 78B being moved upward inside the guide hole 77B.

It should be noted that in the lower foreign matter detecting mechanism 90, the other actuating member 73B also makes a similar seesaw movement to detect a foreign matter 71 lodged in a different longitudinal position. Also in the lower foreign matter detecting mechanism 90, even in case a foreign matter 71 is lodged in a position near the center of the actuating member 73, the latter will be pivoted about any of the guide pins 78.

In the lower foreign matter detecting mechanism 90, in case the audio unit 2 is moved downward with a foreign matter 71 being lodged near the center of the audio unit 2 as shown in FIG. 32C, the coupling actuating plate 74 is pivoted and also has the actuating members 73 pivoted to detect the foreign matter 71. Also, in case a foreign matter 71 is lodged in a position to the right of the coupling actuating plate 74, for example, the coupling actuating plate 74 abutting the foreign matter 71 will be pivoted about the left guide pin 80A with the right guide pin 80B being moved inside the guide hole 79B.

In the lower foreign matter detecting mechanism 90, the coupling actuating plate 74 pushes up the coupling convexity 82B of the right actuating member 73B by means of the right coupling convexity 83B. The actuating member 73B will be pivoted about the outer guide pin 78B against the resilience of the helical spring 76 to turn on the inner detection switch 75B with the inner guide pin 78A being moved upward inside the guide hole 77A.

It should be noted that although the lower foreign matter detecting mechanism 90 is constructed so that the narrow space will be defined in a position where the bracket member 72 is opposite to the stand 5 to accommodate the coupling actuating plate 74 and the actuating members 73 be accommodated in the wide spaces, respectively, across the narrow space, it is of course that the present invention is not limited to this design. For example, in case the spaces across the central space are so wide that it is difficult to make a large, precision actuating member 73, a coupling actuating member formed like a box similar to the actuating members 73 may be provided between the latter to detect a foreign matter 71.

It should be understood by those skilled in the art that various modifications, combinations, sub-combinations and alterations may occur depending on design requirements and other factors insofar as they are within the scope of the appended claims or the equivalents thereof.

The invention claimed is:

1. An audio/display apparatus comprising:
an audio unit including speaker units that reproduce and output audio information;
a display unit including a display screen on which video information is displayed;
a support frame to support the display unit fixedly;
a carrier which supports the audio unit and is supported on the support frame to be movable; and
carrier moving mechanisms to move the carrier in relation to the support frame,
each of the carrier moving mechanisms include a shaft-like feed screw supported on the carrier in parallel to the moving direction of the carrier, a driving member being in mesh with the feed screw and a drive motor that rotates the driving member, and
as the driving member is rotated by the drive motor, the feed screw being moved along with the carrier to move the audio unit between the first and second positions
as the carrier is moved by the carrier moving mechanisms, the audio unit being moved between a first position in which it will uncover the entire display screen of the display unit and a second position in which it will overlap, and cover at least a part of, the display screen,
wherein a guide roller mechanism is combined with each of a plurality of guide rails provided along the height of the display unit the guide roller mechanism is guided by the guide rail so that the audio unit will be moved between the first and second positions, and each of the plurality of guide roller mechanisms includes a pair of guide roller mechanisms to support the support frame at one side and another pair of guide roller mechanisms to support the support frame at the other side opposite to the one side.

2. An audio/display apparatus comprising:

an audio unit including speaker units that reproduce and output audio information;

a display unit including a display screen on which video information is displayed;

a support frame to support the display unit fixedly;

a carrier which supports the audio unit and is supported on the support frame to be movable; and carrier moving mechanisms to move the carrier in relation to the support frame, each of the carrier moving mechanisms include a shaft-like feed screw supported on the carrier in parallel to the moving direction of the carrier, a driving member being in mesh with the feed screw and a drive motor that rotates the driving member, and as the driving member is rotated by the drive motor, the feed screw being moved along with the carrier to move the audio unit between the first and second positions as the carrier is moved by the carrier moving mechanisms, the audio unit being moved between a first position in which it will uncover the entire display screen of the display unit and a second position in which it will overlap, and cover at least a part of, the display screen, wherein a guide roller mechanism is combined with each of a plurality of guide rails provided along the height of the display unit; and the guide roller mechanism is guided by the guide rail so that the audio unit will be moved between the first and second positions, and the plurality of guide roller mechanisms is supported on the guide rails under the pressure of a forcing member to limit the moving-directional rotation of the carrier moved along with the feed screw.

3. The audio/display apparatus according to claim 1 or 2, wherein the audio unit is formed to have a size large enough to cover the entire display screen of the display unit and when moved to the second position, it will cover the entire display screen.

4. The audio/display apparatus according to claim 1 or 2, wherein the display unit displays any one of video information sent by a television broadcast, video information distributed via a communications network and video information reproduced by a recording-medium recorder/player; and the audio unit reproduces and outputs, by speaker units, any one of audio information sent by a television broadcast, radio broadcast or the like, audio information sent via a communications network and audio information reproduced by a recording-medium recorder/player.

5. The audio/display apparatus according to claim 1 or 2, wherein the audio unit includes a recorder/player in which a recording medium is removably set to record and reproduce audio/video information sent by a television broadcast, radio broadcast, cable broadcasting or the like and audio/video information sent via a communications network.

6. The audio/display apparatus according to claim 1 or 2, wherein the audio unit is moved to the first position when a video display mode in which a picture is to be displayed on the display screen of the display unit is selected.

7. The audio/display apparatus according to claim 1 or 2, wherein a front panel to cover the front side of the audio unit is removably attached to the audio unit.

8. The audio/display apparatus according to claim 1 or 2, wherein a columnar support is provided at the base end of the support frame supporting the display unit;

the carrier moving mechanisms are installed on a carrier moving mechanism retainer located in an area where the audio unit supported movably in relation to the display unit is to be positioned and which is projected from the columnar support of the support frame; and the carrier moving mechanisms are so installed on the carrier moving mechanism retainer that it will be accommodated in the audio unit when the carrier is moved in relation to the support frame down to the first position.

9. The audio/display apparatus according to claim 1 or 2, wherein each of the carrier moving mechanisms includes at least one pair of shaft-like feed screws supported on the carrier in parallel to the moving direction of the carrier, a pair of driving members being in mesh with the respective feed screws and a drive motor to rotate the pair of driving members; and as the pair of driving members is rotated by the drive motor, the pair of feed screws is moved along with the carrier to move the carrier between the first and second positions.

10. The audio/display apparatus according to claim 9, wherein since the pair of driving members is adapted so that the position where it is in mesh with the feed screw can be adjusted, the tilting direction of the carrier is adjustable.

11. The audio/display apparatus according to claim 9, wherein the driving members in pair are rotated by the drive motor synchronously with each other.

12. An audio/display apparatus comprising:

an audio unit including speaker units that reproduce and output audio information;

a display unit including a display screen on which video information is displayed;

a support frame to support the display unit fixedly;

a carrier which supports the audio unit and is supported on the support frame to be movable;

the carrier is supported by a pivot bearing mechanism provided at the top of the feed screw so that it can be tilted in relation to the feed screw, carrier moving mechanisms to move the carrier in relation to the support frame, each of the carrier moving mechanisms include a shaft-like feed screw supported on the carrier in parallel to the moving direction of the carrier, a driving member being in mesh with the feed screw and a drive motor that rotates the driving member, and as the driving member is rotated by the drive motor, the feed screw being moved along with the carrier to move the audio unit between the first and second positions as the carrier is moved by the carrier moving mechanisms, the audio unit being moved between a first position in which it will uncover the entire display screen of the display unit and a second position in which it will overlap, and cover at least a part of, the display screen, wherein a guide roller mechanism is combined with each of a plurality of guide rails provided along the height of the display unit the guide roller mechanism is guided by the guide rail so that the audio unit will be moved between the first and second positions, and the pivot bearing mechanism includes a first holder having a support piece provided at the upper end of the feed screw and a second holder combined with the first holder and installed on the periphery of the feed screw; and the support piece has a hemispheric abutment to support the carrier.

13. The audio/display apparatus according to claim 12, wherein
the first holder has a rotation limiter engaged on the carrier to limit the rotation of the carrier and a retainer engaged in the groove of the feed screw to prevent the first holder from coming off the feed screw.

14. An audio/display apparatus comprising:
an audio unit including speaker units that reproduce and output audio information;
a display unit including a display screen on which video information is displayed;
a support frame to support the display unit fixedly;
a carrier which supports the audio unit and is supported on the support frame to be movable; and
carrier moving mechanisms to move the carrier in relation to the support frame,
as the carrier is moved by the carrier moving mechanisms, the audio unit being moved between a first position in which it will uncover the entire display screen of the display unit and a second position in which it will overlap, and cover at least a part of, the display screen
and wherein a guide roller mechanism is combined with each of a plurality of guide rails provided along the height of the display unit; and
the guide roller mechanism is guided by the guide rail so that the audio unit will be moved between the first and second positions, and
a guide roller mechanism is combined with each of a plurality of guide rails provided along the height of the display unit; and the guide roller mechanism is guided by the guide rails so that the audio unit will be moved between the first and second positions;
the plurality of guide rails includes a pair of upper guide rails provided at either side of a portion of the support frame where the display unit is supported and a pair of lower guide rails provided at either side of a columnar support provided at the base end of the support frame;
the upper and lower guide rails are disposed in different front and back positions and right and left positions, respectively.

15. The audio/display apparatus according to claim 14, wherein the pluralities of guide roller mechanisms combined with the pairs of upper and lower guide rails, respectively, are supported on the guide rails under the pressure of a forcing member to limit the moving-directional rotation of the carrier moved along with the feed screw.

* * * * *